US012393156B2

(12) United States Patent
Matsuda

(10) Patent No.: US 12,393,156 B2
(45) Date of Patent: Aug. 19, 2025

(54) IMAGE FORMING APPARATUS WITH A STOPPER TO BLOCK INSERTION OF A TONER CONTAINER

(71) Applicant: Naoki Matsuda, Kanagawa (JP)

(72) Inventor: Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/520,613

(22) Filed: Nov. 28, 2023

(65) Prior Publication Data

US 2024/0176284 A1 May 30, 2024

(30) Foreign Application Priority Data

Nov. 28, 2022 (JP) ................................ 2022-189139

(51) Int. Cl.
*G03G 21/16* (2006.01)
*G03G 15/08* (2006.01)
*G03G 21/18* (2006.01)

(52) U.S. Cl.
CPC ..... *G03G 21/1647* (2013.01); *G03G 15/0867* (2013.01); *G03G 15/0872* (2013.01); *G03G 21/1633* (2013.01); *G03G 21/1676* (2013.01); *G03G 21/1842* (2013.01); *G03G 2215/0665* (2013.01); *G03G 2221/169* (2013.01)

(58) Field of Classification Search
CPC ........... G03G 21/1647; G03G 15/0867; G03G 21/1676; G03G 15/0872; G03G 15/0886; G03G 21/1633; G03G 2221/169; G03G 2215/0665; G03G 2215/0695; G03G 21/1842
See application file for complete search history.

(56) References Cited

U.S. PATENT DOCUMENTS

RE47,086 E * 10/2018 Taguchi ............. G03G 15/0872
2004/0170447 A1* 9/2004 Arai ....................... G03G 15/01 399/111
2004/0256792 A1* 12/2004 Kuwata .................. B65H 31/22 271/207
2005/0196180 A1* 9/2005 Harumoto .......... G03G 15/0863 399/12

(Continued)

FOREIGN PATENT DOCUMENTS

JP H07-168430 A 7/1995
JP 2008-114503 A 5/2008
JP 2011-215473 A 10/2011

*Primary Examiner* — Stephanie E Bloss
*Assistant Examiner* — Laura Roth
(74) *Attorney, Agent, or Firm* — XSENSUS LLP

(57) ABSTRACT

An image forming apparatus includes an apparatus body, a detachable unit detachably attached to the apparatus body, a metal plate component, an insertion cover, and a stopper. The insertion cover has an insertion opening into which the detachable unit is insertable in an insertion direction. The stopper includes a blocking projection and a contact. The blocking projection is inside the insertion opening of the insertion cover. The blocking projection has a shape that matches with a groove of the detachable unit compatible with the apparatus body and does not match with a groove of the detachable unit incompatible with the apparatus body. The contact contacts the metal plate component in a direction orthogonal to the insertion direction.

11 Claims, 21 Drawing Sheets

(56) References Cited

U.S. PATENT DOCUMENTS

| | | | | |
|---|---|---|---|---|
| 2007/0269236 | A1* | 11/2007 | Takuwa | G03G 15/0872 399/258 |
| 2011/0243579 | A1 | 10/2011 | Oshikawa et al. | |
| 2012/0033998 | A1* | 2/2012 | Hori | G03G 15/0872 399/258 |
| 2016/0033928 | A1* | 2/2016 | Ishimitsu | G10K 11/002 399/110 |
| 2017/0221469 | A1* | 8/2017 | Ishida | G10K 11/172 |
| 2022/0004141 | A1 | 1/2022 | Kita et al. | |

* cited by examiner

IMAGE FORMING APPARATUS WITH A STOPPER TO BLOCK INSERTION OF A TONER CONTAINER

CROSS-REFERENCE TO RELATED APPLICATION

This patent application is based on and claims priority pursuant to 35 U.S.C. § 119(a) to Japanese Patent Application No. 2022-189139, filed on Nov. 28, 2022, in the Japan Patent Office, the entire disclosure of which is hereby incorporated by reference herein.

BACKGROUND

Technical Field

Embodiments of the present disclosure relate to an image forming apparatus.

Related Art

In the related art, an image forming apparatus includes an apparatus body having an insertion opening, a detachable unit inserted into the insertion opening and detachably attached to the apparatus body, and a blocking projection to prevent an incompatible unit from being inserted into the insertion opening.

SUMMARY

This specification describes an improved image forming apparatus that includes an apparatus body, a detachable unit detachably attached to the apparatus body, a metal plate component, an insertion cover, and a stopper. The insertion cover has an insertion opening into which the detachable unit is insertable in an insertion direction. The stopper includes a blocking projection and a contact. The blocking projection is inside the insertion opening of the insertion cover. The blocking projection has a shape that matches with a groove of the detachable unit compatible with the apparatus body and does not match with a groove of the detachable unit incompatible with the apparatus body. The contact contacts the metal plate component in a direction orthogonal to the insertion direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
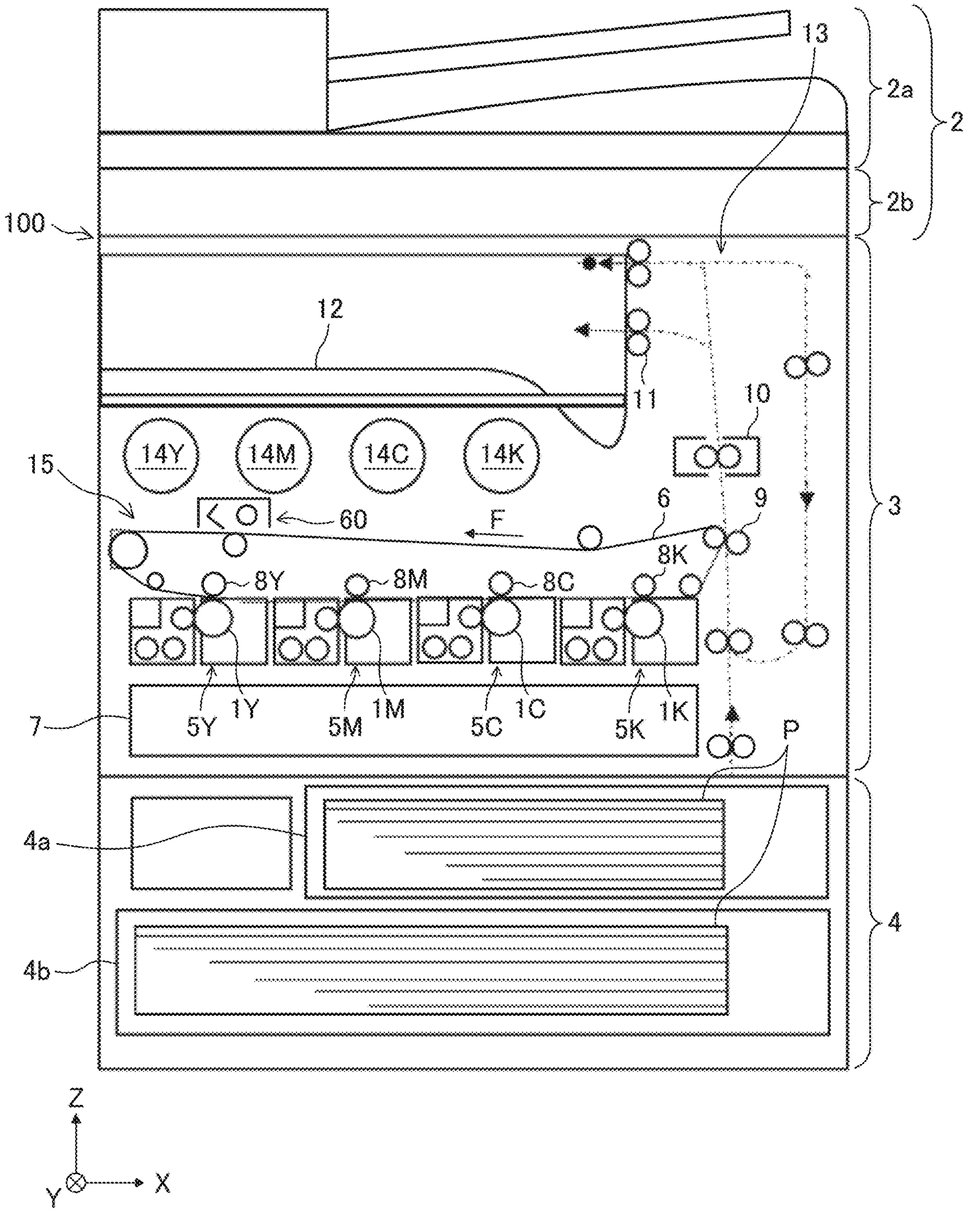
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The following describes an electrophotographic image forming apparatus according to an embodiment of the present disclosure.

FIG. 1 is a schematic diagram illustrating a configuration of an image forming apparatus 100 according to the present embodiment.

In FIG. 1, a vertical direction in the image forming apparatus 100 is indicated by an arrow Z, a front-back direction in the image forming apparatus 100 is indicated by an arrow Y, and a left and right direction in the image forming apparatus 100 is indicated by an arrow X.

The image forming apparatus 100 includes an image forming section 3, a sheet feeding section 4, and an image reading device 2 that reads an image of a document as an image forming target. The image reading device 2 is disposed above the image forming section 3 and includes a document feeder 2*a* and a scanner 2*b*. The sheet feeding section 4 is disposed below the image forming section 3 and includes two sheet trays 4*a* and 4*b* for storing sheets P.

The image forming section 3 includes an intermediate transfer unit 15 including an intermediate transfer belt 6 and four image forming units 5Y, 5M, 5C, and 5K for forming respective color images. The intermediate transfer belt 6 rotates in a direction indicated by an arrow F in FIG. 1. The image forming units 5Y, 5M, 5C, and 5K are arranged along the intermediate transfer belt 6. The image forming units 5Y, 5M, 5C, and 5K include photoconductors 1Y, 1M, 1C, and 1K, respectively, as drum-shaped image bearers. In addition, the image forming section 3 includes an exposure device 7.

The intermediate transfer unit 15 includes the intermediate transfer belt 6 having an endless shape and wound around multiple support rollers, primary transfer rollers 8Y, 8C, 8M, and 8K, and a belt cleaner 6*a* to clean the surface of the intermediate transfer belt 6. The primary transfer rollers 8Y, 8M, 8C, and 8K are disposed inside the loop of the intermediate transfer belt 6 and transfer the toner images from the photoconductors 1Y, 1M, 1C, and 1K onto the intermediate transfer belt 6. A secondary transfer roller 9 is disposed downstream from the primary transfer rollers 8Y, 8M, 8C, and 8K in a direction that the intermediate transfer belt 6 moves. The secondary transfer roller 9 faces the intermediate transfer belt 6. In addition, the image forming section 3 includes a fixing device 10 to fix an image onto the sheet P and an output roller pair 11 that are above the secondary transfer roller 9.

The four image forming units 5Y, 5M, 5C, and 5K have a similar configuration except for the color of toner used therein. In the following description, the suffixes Y, M, C, and K are omitted when color discrimination is not necessary. Around the photoconductor 1, the image forming unit 5 includes a charging device to charge the surface of the photoconductor 1 and a developing device to develop a latent image on the photoconductor 1 with toner into a toner image. Additionally, the image forming unit 5 includes a cleaning device to clean the surface of the photoconductor 1 after the toner image is transferred from the photoconductor 1 to the intermediate transfer belt 6.

Operations of the image forming apparatus 100 according to the present embodiment are described below.

In response to receiving a start signal to start image formation, a controller 50 as circuitry in the image forming apparatus 100 controls a driver to start rotating the intermediate transfer belt 6. The driver also starts rotating the photoconductor 1Y in the image forming unit 5Y to form the yellow toner image, and the charging device uniformly charges the photoconductor 1Y The exposure device 7 irradiates the photoconductor 1Y with a laser beam to form an electrostatic latent image. The developing device develops the electrostatic latent image to form the yellow toner image on the photoconductor 1Y Similarly, the image forming units 5M, 5C, and 5K form a magenta toner image, a cyan toner image, and a black toner image on the photoconductors 1M, 1C, and 1K, respectively. With the movement of the intermediate transfer belt 6, the primary transfer rollers 8Y, 8M, 8C, and 8K sequentially transfer the yellow, magenta, cyan, and black toner images from the photoconductors 1Y, 1M, 1C, and 1K to the intermediate transfer belt 6, respectively to form a composite color image on the intermediate transfer belt 6. The controller 50 performs the image forming operations for forming the yellow, magenta, cyan, and black toner images at different timings from the upstream side to the downstream side in the direction that the intermediate transfer belt 6 moves so that the yellow, magenta, cyan, and black toner images are transferred to and superimposed on the same position of the intermediate transfer belt 6.

On the other hand, the sheet feeding section 4 feeds the sheet P from the upper sheet tray 4*a* or the lower sheet tray 4*b*, and conveyance rollers convey the sheet P to a secondary transfer nip formed by the intermediate transfer belt 6 and the secondary transfer roller 9. The secondary transfer roller 9 transfers the composite color image on the intermediate transfer belt 6 onto the sheet P to form a color image on the sheet P. The sheet P bearing the color image is sent to the fixing device 10 to fix the color image onto the sheet P. After the color image is fixed onto the sheet P in the fixing device 10, the output roller pair 11 ejects the sheet P to stack the sheet P on an output tray 12, or the sheet P is sent to a reverse path 13 to form a toner image on the other side of the sheet P.

The cleaning device in each of the image forming units 5Y, 5M, 5C, and 5K cleans residual toner on each of the photoconductors 1Y, 1M, 1C, and 1K after the toner image is transferred. The belt cleaner 6*a* cleans residual toner on the intermediate transfer belt 6 after the composite color image is transferred.

The above-described image formation consumes toner in each of the developing devices. The image forming apparatus 100 includes toner bottles 14Y, 14M, 14C, and 14K filled with yellow, magenta, cyan, and black toners, respectively and illustrated on the upper left side in FIG. 1. A predetermined amount of toner is supplied from each toner bottle to each developing device through a toner conveyance path. The arrangement order of the four image forming units 5Y, 5M, 5C, and 5K and the toner bottles 14Y, 14M, 14C, and 14K is not limited to the example illustrated in FIG. 1.

When the image forming apparatus 100 according to the present embodiment forms a copy of the document, the document having a sheet shape is set on the document feeder 2*a* of the image reading device 2. After the document is set on the document feeder 2*a*, pushing a copy start switch causes the image reading device 2 to start a document reading operation. Specifically, the document feeder 2*a* conveys the document, and the scanner 2*b* reads the document.

In parallel with the document reading operation, the devices in the image forming units 5Y, 5M, 5C, and 5K, the intermediate transfer belt 6, the secondary transfer roller 9, and the fixing device 10 start operations. Based on image data read by the image reading device 2, the exposure device 7 is driven and controlled to form the yellow, magenta, cyan, and black toner images on the photoconductors 1Y, 1M, 1C, and 1K, respectively.

The yellow, magenta, cyan, and black toner images are transferred onto the intermediate transfer belt 6 and superimposed on the intermediate transfer belt 6 to form a four color toner image.

Almost simultaneously with the start of the document reading operation, the sheet feeding section 4 starts a sheet feeding operation. The sheet feeding section 4 includes the sheet trays 4*a* and 4*b* accommodated and overlapped in the image forming apparatus 100. In the sheet feeding operation, one of the sheet trays 4*a* and 4*b* feeds the sheet P. The conveyance rollers convey the fed sheet P toward the secondary transfer nip.

Figure 2A:
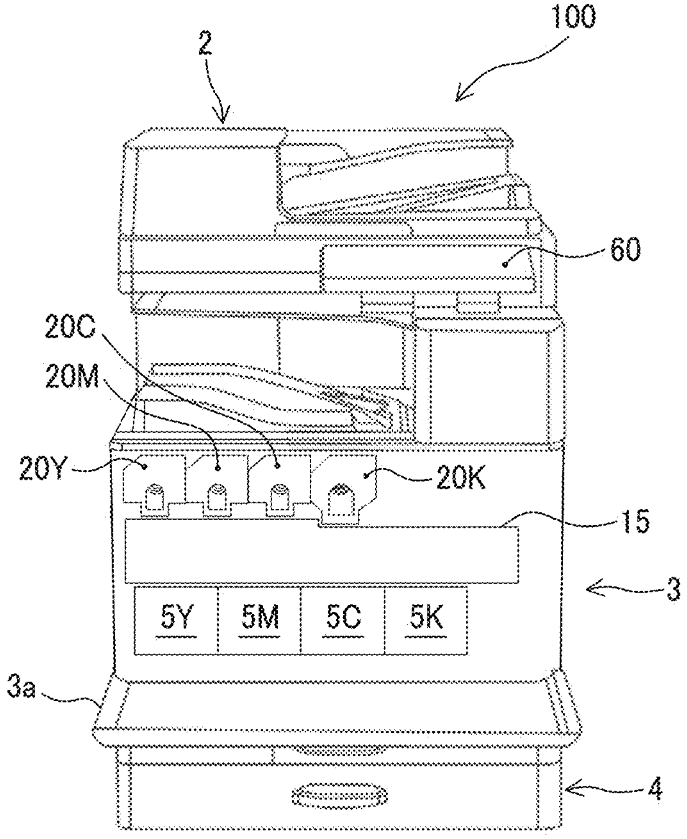
FIG. 2A is a front view of the image forming apparatus of FIG. 1 in which a front cover is opened.
Figure 2B:
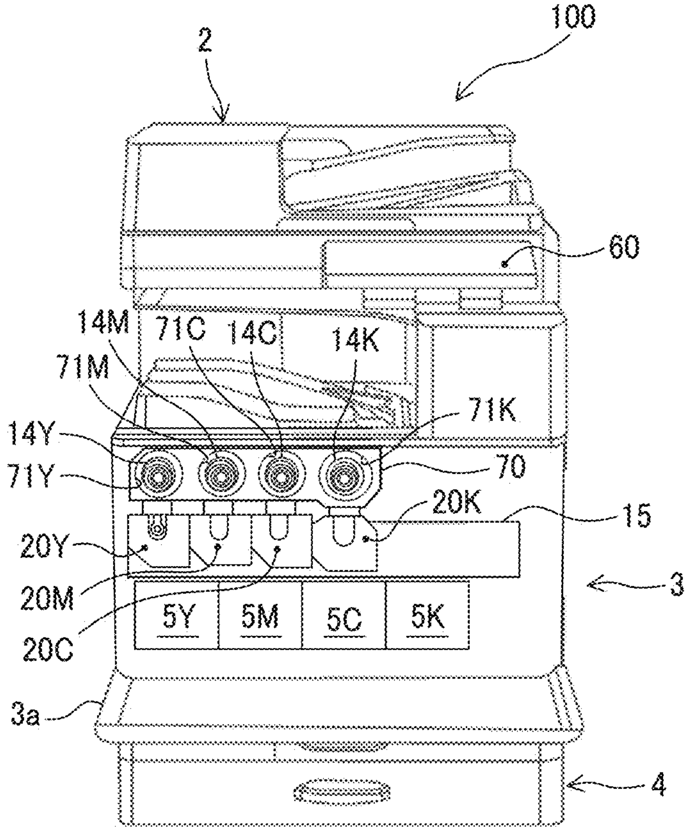
FIG. 2B is a front view of the image forming apparatus of FIG. 1 in which the front cover and bottle covers are opened.

FIG. 2A is a front view of the image forming apparatus 100 in which the front cover 3*a* is opened, and FIG. 2B is a front view of the image forming apparatus 100 in which the front cover 3*a* and bottle covers 20Y, 20M, 20C, and 20K are opened. The bottle cover is an example of a rotating member.

As illustrated in FIG. 2A, the lower end of the front cover 3*a* is rotatably supported by the image forming section 3. Opening the front cover 3*a* exposes the intermediate transfer unit 15 and the image forming units 5Y, 5M, 5C, and 5K. As a result, the intermediate transfer unit 15 and the image forming units can be attached to and detached from the image forming apparatus 100.

In addition, opening the front cover 3*a* exposes the bottle covers 20Y, 20M, 20C, and 20K that open and close bottle insertion openings 71Y, 71M, 71C, and 71K of a bottle insertion cover 70 of the image forming section 3. The bottle insertion cover 70 is made of resin. Opening the bottle covers 20Y, 20M, 20C, and 20K exposes the toner bottles 14Y, 14M, 14C, and 14K stored in the bottle housing of the image forming section 3, and the toner bottles 14Y, 14M, 14C, and 14K can be attached to and detached from the bottle insertion openings 71Y, 71M, 71C, and 71K, respectively.

Lock devices 40 (see FIGS. 3, 22, and 23A and 23B) lock the bottle covers 20Y, 20M, 20C, and 20K at closed positions at which the bottle covers 20Y, 20M, 20C, and 20K cover the bottle insertion openings 71Y, 71M, 71C, and 71K, respectively. In response to toner depletion of any one of the yellow, magenta, cyan, and black toners in the toner bottles, the controller 50 controls the lock device to unlock the bottle cover corresponding to the toner depletion.

As illustrated in FIGS. 2A and 2B, the image forming apparatus 100 includes a control panel 60.

Figure 3:
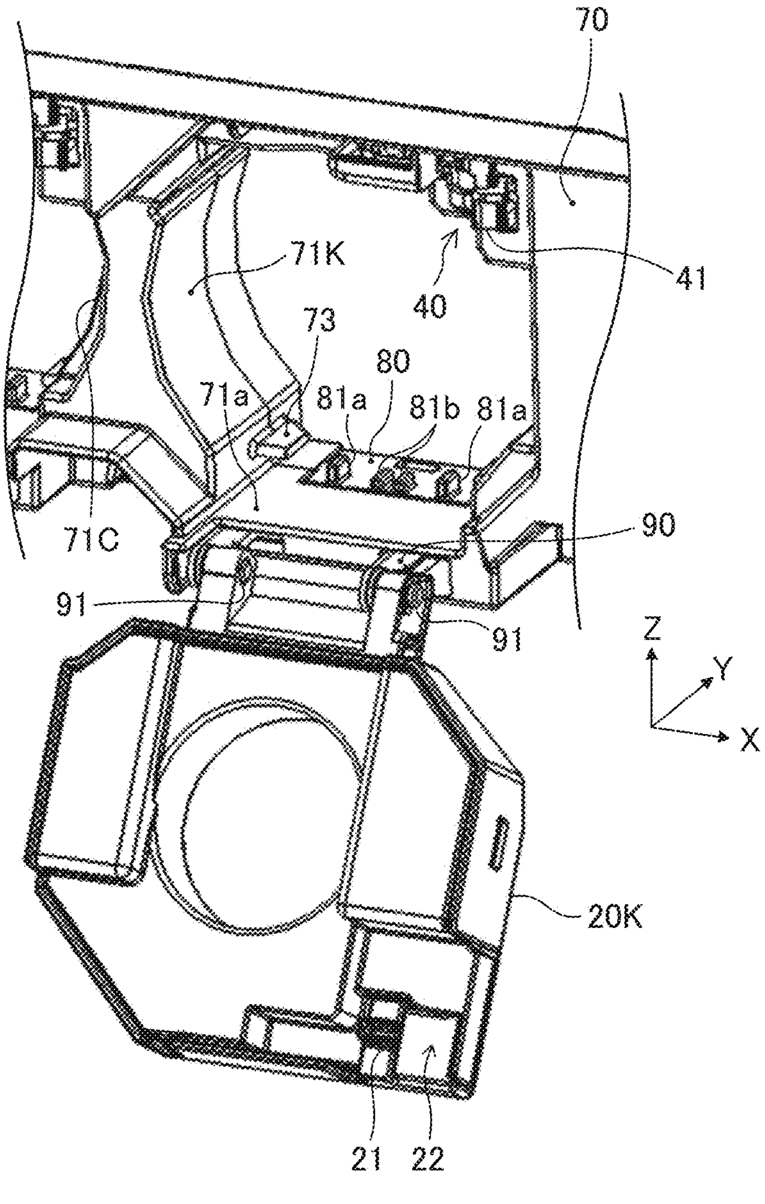
FIG. 3 is an enlarged schematic view of the bottle cover covering a toner bottle to store black toner and parts around the bottle cover.
Figure 4:
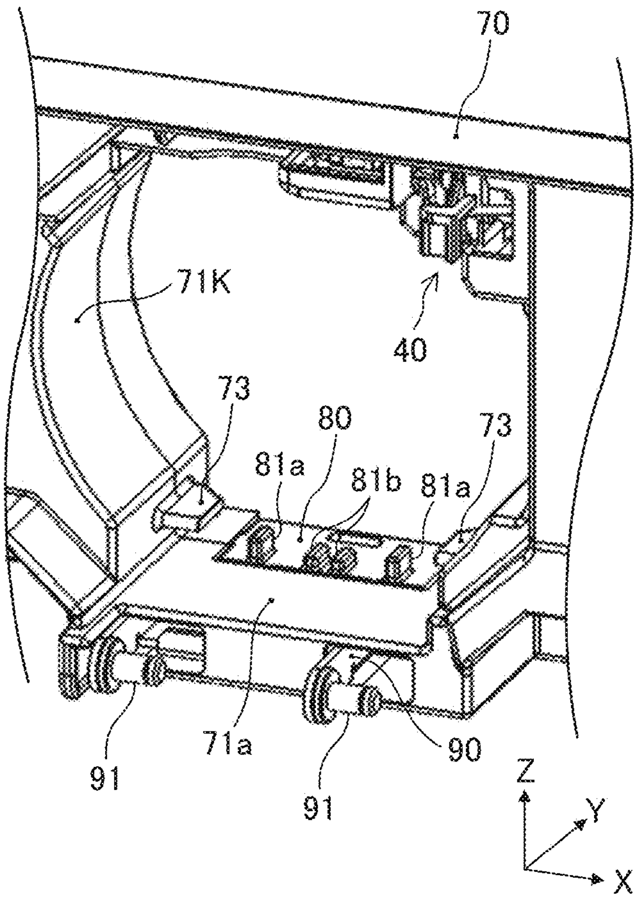
FIG. 4 is an enlarged schematic view of the parts around the bottle cover after the bottle cover is removed from FIG. 3.

FIG. 3 is an enlarged schematic view of the bottle cover 20K covering the toner bottle 14K to store black toner and parts around the bottle cover 20K. FIG. 4 is an enlarged schematic view of the parts around the bottle cover 20K after the bottle cover 20K is removed from FIG. 3.

Above the bottle insertion opening 71K of the bottle insertion cover 70, the lock device 40 is disposed. The lock device 40 locks the bottle cover 20K at the closed position. The bottle cover 20K has a locked portion 21 and a lock claw housing 22. The lock device 40 includes a lock lever 41 having a lock claw. The lock claw enters the lock claw housing 22 and engages the locked portion 21. The lock device 40 is described in detail later.

The bottle insertion cover 70 includes a metal plate component 90. The metal plate component 90 includes a pair of support shafts 91. The pair of support shafts 91 rotatably supports the bottle cover 20K. The bottle insertion cover 70 has a recessed portion forming a lower part of the bottle insertion opening 71K. The recessed portion includes a bottom face portion 71*a*. The bottom face portion 71*a* includes a key 80 made of resin. The key 80 serves as a stopper and includes blocking projections 81*a* and 81*b* to prevent the toner bottle incompatible with the image forming apparatus from being mounted. In addition, guide projections 73 are disposed on both sides of the recessed portion to guide the toner bottle 14K.

Regarding the toner bottles 14Y, 14M, and 14C, the image forming apparatus is similarly configured.

Figure 5:
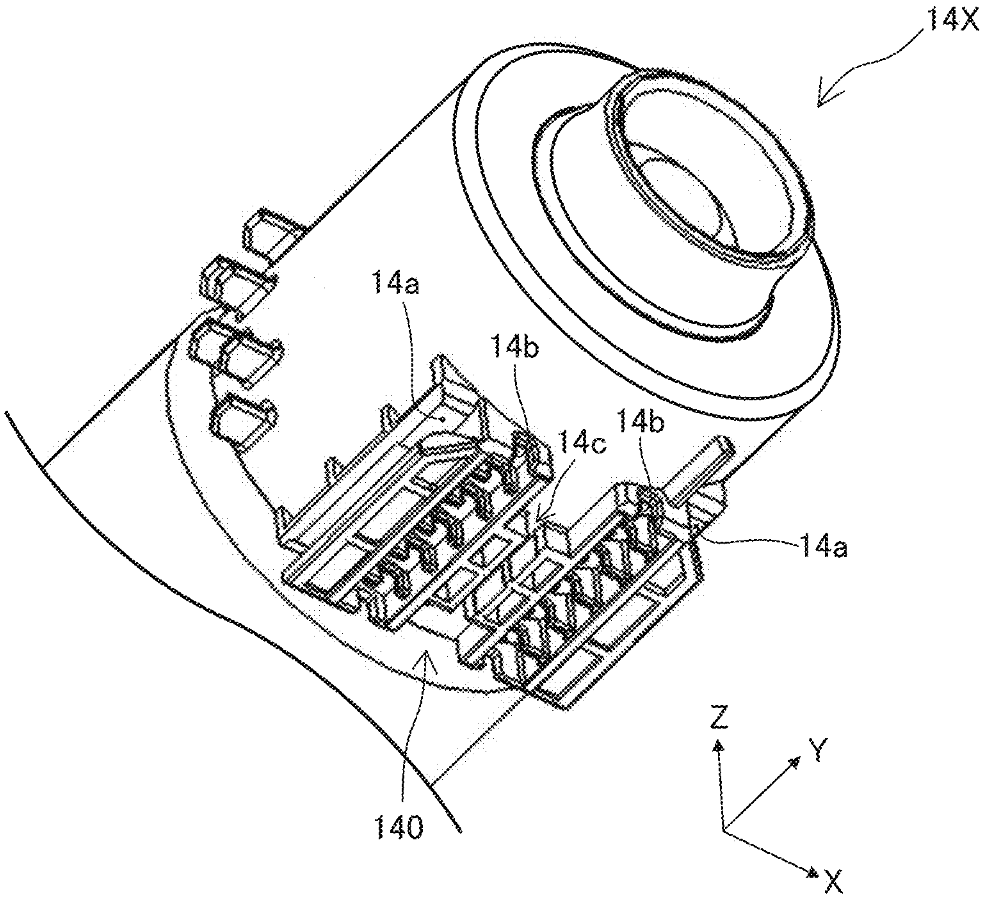
FIG. 5 is a perspective view of a lower portion of a downstream end of a toner bottle incompatible with the image forming apparatus of FIG. 1 in a direction in which the toner bottle is inserted into the apparatus body.

FIG. 5 is a perspective view of a lower portion of a downstream end of a toner bottle 14X incompatible with the image forming apparatus 100 in a direction in which the toner bottle 14X is inserted into the apparatus body.

As illustrated in FIG. 5, the toner bottle 14X includes a fitting portion 140. The fitting portion 140 has guide grooves 14*a* on both sides of the fitting portion 140 in the X direction that is the lateral direction of the image forming apparatus. The guide projection 73 enters the guide groove 14*a*. The fitting portion 140 has clearance grooves 14*b* and 14*c* to avoid interference between the fitting portion 140 and the blocking projections 81*a* and 81*b*. The blocking projections 81*a* and 81*b* enter the clearance grooves 14*b* and 14*c*, respectively. The clearance grooves 14*b* are arranged side by side in the X direction. As illustrated in FIGS. 3 and 4, the key 80 includes the blocking projections 81*a* arranged side by side in the X direction, and the blocking projection 81*a* is taller than the blocking projection 81*b*. The blocking projections 81*a* enter the clearance grooves 14*b* to avoid the interference between the fitting portion 140 and the key 80. The clearance groove 14*c* is at the center of the fitting portion 140 in the X direction. As illustrated in FIGS. 3 and 4, the blocking projection 81*b* is at the center of the key 80 in the X direction, and the blocking projection 81*b* is shorter than the blocking projection 81*a*. The blocking projection 81*b* enters the clearance groove 14*c* to avoid the interference between the fitting portion 140 and the key 80. The clearance groove 14*c* is shorter than the clearance groove 14*b* in the Y direction that is the direction in which the toner bottle is inserted into the apparatus body and disposed substantially in the vicinity of the center of the clearance groove 14*b* in the Y direction.

As illustrated in FIG. 5, the toner bottle 14X incompatible with the image forming apparatus 100 has one clearance groove 14*c* in which the short blocking projection 81*b* in a center portion of the key 80 in the X direction can enter. In contrast, each of the toner bottles 14Y, 14M, 14C, and 14K compatible with the image forming apparatus 100 has two clearance grooves 14*c*. Two short blocking projections 81*b* arranged side by side in the X direction in the center portion of the key 80 can enter the two clearance grooves 14*c* to avoid the interference between the key 80 and the toner bottle. In other words, the key 80 as the stopper includes a blocking projection having a shape that matches with a groove of the detachable unit compatible with the apparatus body, such as each of the toner bottles 14Y, 14M, 14C, and 14K, and does not match with a groove of the detachable unit incompatible with the apparatus body, such as the toner bottle 14X. Other than the above-described structure, the structure of the toner bottle compatible with the image forming apparatus 100 is the same as the structure of the toner bottle 14X incompatible with the image forming apparatus 100.

Inserting the incompatible toner bottle 14X into the bottle insertion opening 71 causes the guide projections 73 to enter the guide grooves 14*a* of the fitting portion 140, and the tall blocking projections 81*a* arranged side by side in the X direction enter the clearance grooves 14*b*. The guide projections 73 and the tall blocking projections 81*a* guide the incompatible toner bottle 14X inserted. However, as illustrated in FIGS. 3 and 4, there are two short blocking projections 81*b* disposed on the apparatus body. The fitting portion 140 of the incompatible toner bottle 14X butts against the blocking projections 81*b*. The blocking projections 81*b* prevent the incompatible toner bottle 14X from being inserted into the bottle insertion opening 71.

In contrast, each of the toner bottles compatible with the image forming apparatus 100 has two clearance grooves 14*c* as described above. Two short blocking projections 81*b* arranged side by side in the X direction in the center portion of the key 80 can enter the two clearance grooves 14*c* to avoid the interference between the key 80 and the toner bottle. The two short blocking projections 81*b* arranged side by side in the X direction in the center portion of the key 80 enter the two clearance grooves 14*c*, respectively while the compatible toner bottle is inserted and guided by the guide projections 73 and the tall blocking projections 81*a*. As a result, the toner bottle compatible with the image forming apparatus can be inserted into the bottle insertion opening 71 and stored in the bottle housing.

When the two short blocking projections 81*b* arranged side by side in the X direction in the center portion of the key 80 enter the two clearance grooves 14*c*, respectively, the guide projections 73 and the tall blocking projections 81*a* guide the downstream end of the toner bottle 14 in the direction in which the toner bottle is inserted into the apparatus body. The above-described structure in the toner bottle 14 compatible with the image forming apparatus enables smoothly entering each of the short blocking projections 81*b* arranged side by side in the X direction in the center portion of the key 80 to the clearance groove 14*c* corresponding to the each of the short blocking projections 81*b*. As a result, the toner bottle can be easily installed into the apparatus body.

Figure 6:
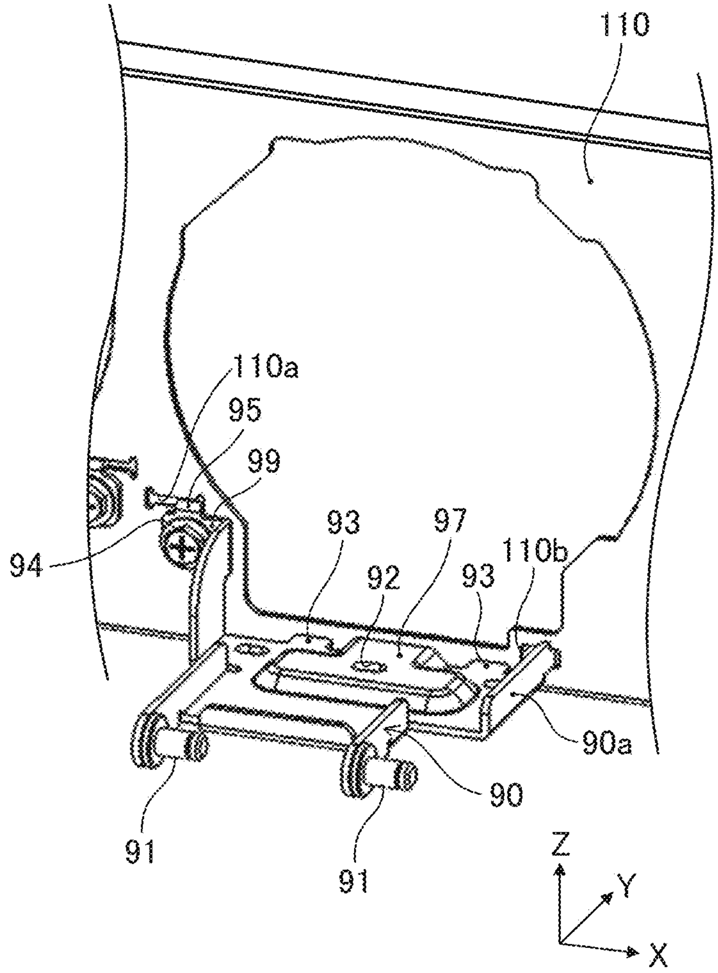
FIG. 6 is a perspective view of a metal plate component and a front side plate of the image forming apparatus.
Figure 7:
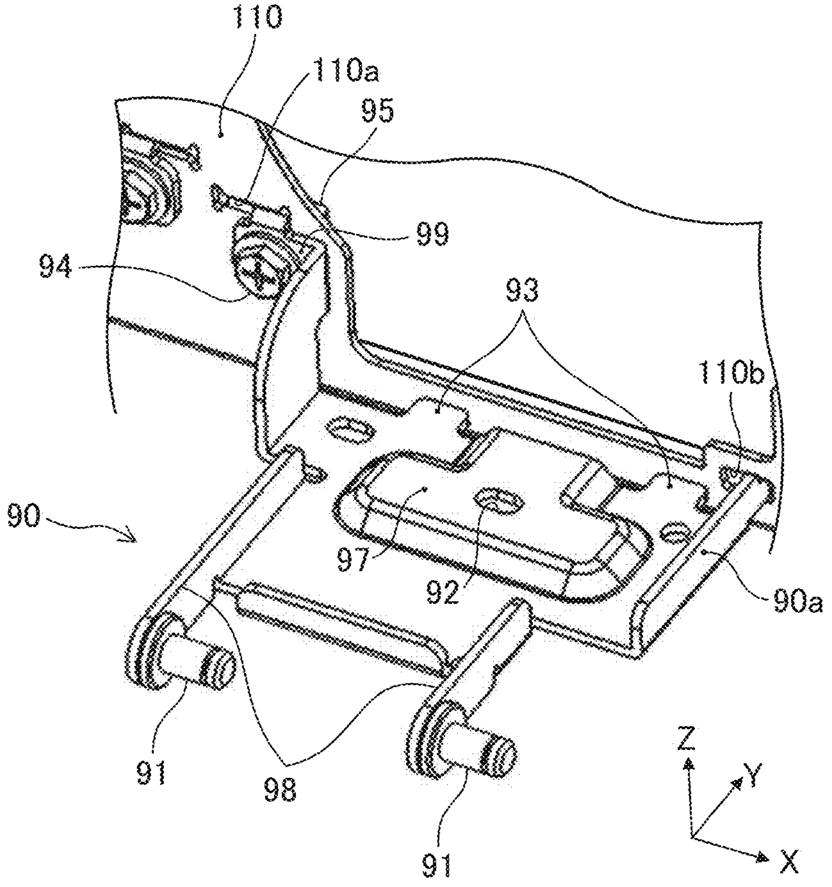
FIG. 7 is an enlarged perspective view of the metal plate component of FIG. 6 and parts around the metal plate component.
Figure 8:
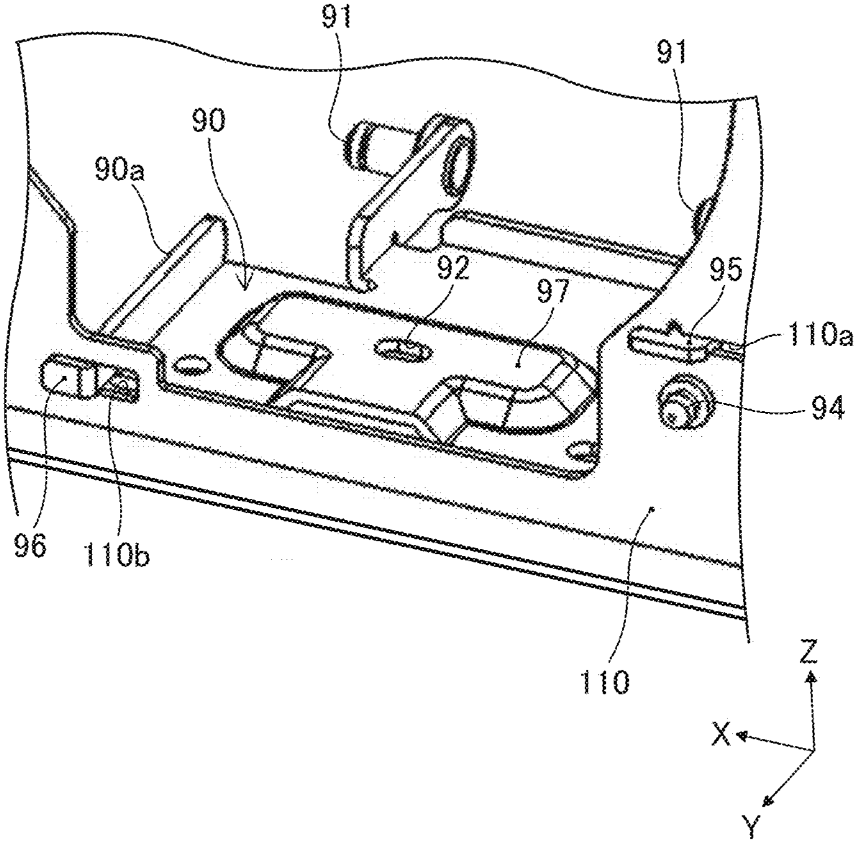
FIG. 8 is an enlarged perspective view of the metal plate component and the parts of FIG. 7 viewed from the inside of the image forming apparatus.
Figure 9:
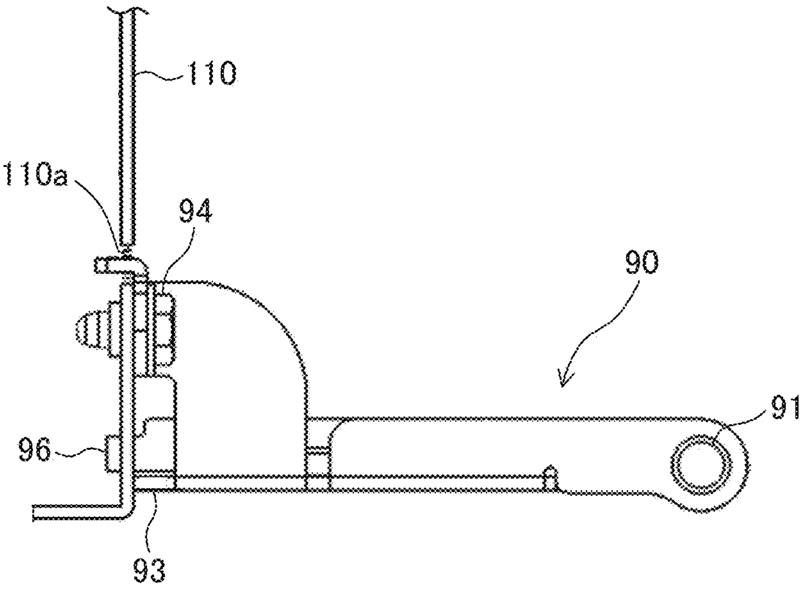
FIG. 9 is a side view of the metal plate component attached to the front side plate of the image forming apparatus.

FIG. 6 is a perspective view of a metal plate component 90 and a front side plate 110 of the image forming apparatus. FIG. 7 is an enlarged perspective view of the metal plate component 90 and parts around the metal plate component 90. FIG. 8 is an enlarged perspective view of the metal plate component 90 and the parts of FIG. 7 viewed from the inside of the image forming apparatus. FIG. 9 is a side view of the metal plate component 90 attached to the front side plate 110 of the image forming apparatus.

The metal plate component 90 includes support shafts 91 and a pair of arms 98. The pair of arms extends from the front side plate 110 toward the outside of the image forming apparatus. The support shaft 91 is disposed at the distal end of the arm 98 and rotatably supports the bottle cover 20. The support shaft 91 extends from the arm 98 to the right side in FIGS. 6 and 7. Accordingly, moving the bottle cover 20 to the left side in FIGS. 6 and 7 enables the bottle cover 20 to be supported by the support shafts 91.

The support shaft 91 on the metal plate component 90 having high rigidity to support the bottle cover 20 has the following advantage. Closing the front cover 3*a* while the bottle cover 20 is opened causes the front cover 3*a* to butt against the bottle cover 20, applying an impact to the support shaft supporting the bottle cover. At this time, the above-described structure can prevent deformation of the arm 98. As a result, the above-described structure can prevent occurrence of a disadvantage such as the support shaft 91 being inclined and the bottle cover 20 not being closed.

In addition, the metal plate component 90 includes a contact pedestal 97 with which the key 80 comes into contact.

The contact pedestal 97 has a positioning hole 92 substantially at the center of the contact pedestal 97 to position the key 80.

The metal plate component 90 includes a fastened portion 99 on the left side in FIGS. 6 and 7. The fastened portion 99 is fastened to the front side plate 110 made of a sheet metal by a screw 94. In addition, the metal plate component 90 includes a bent portion 90*a* on the right side in FIGS. 6 and 7. The metal plate component 90 includes a hook 95 disposed on a back side of the fastened portion 99 and a hook 96 disposed on a back side of the bent portion 90*a* to hook the metal plate component 90 to the front side plate 110 of the image forming apparatus. As illustrated in FIG. 8, the distal ends of the hooks 95 and 96 extend to the right side (that is the +X direction) of the image forming apparatus.

The front side plate 110 of the image forming apparatus has hook holes 110*a* and 110*b* that extend in the X direction. The hook 95 on the fastened portion 99 passes through the hook hole 110*a* and projects from the back side of the front side plate 110. The hook 96 on the back side of the bent portion 90*a* passes through the hook hole 110*b* and projects from the back side of the front side plate 110.

Sliding the metal plate component 90 to the right side of the image forming apparatus in FIGS. 6 and 7 (that is, to the +X direction) after the hooks 95 and 96 pass through the hook holes 110*a* and 110*b*, respectively allows the hooks 95 and 96 to hold the metal plate component 90 on the front side plate 110 of the image forming apparatus. The screw 94 fastens the fastened portion 99 to the front side plate 110 of the image forming apparatus to assemble the metal plate component 90 to the front side plate 110. In addition, the metal plate component 90 includes a pair of abutting portions 93 that abuts against the front side of the front side plate 110 of the image forming apparatus.

Figure 10:
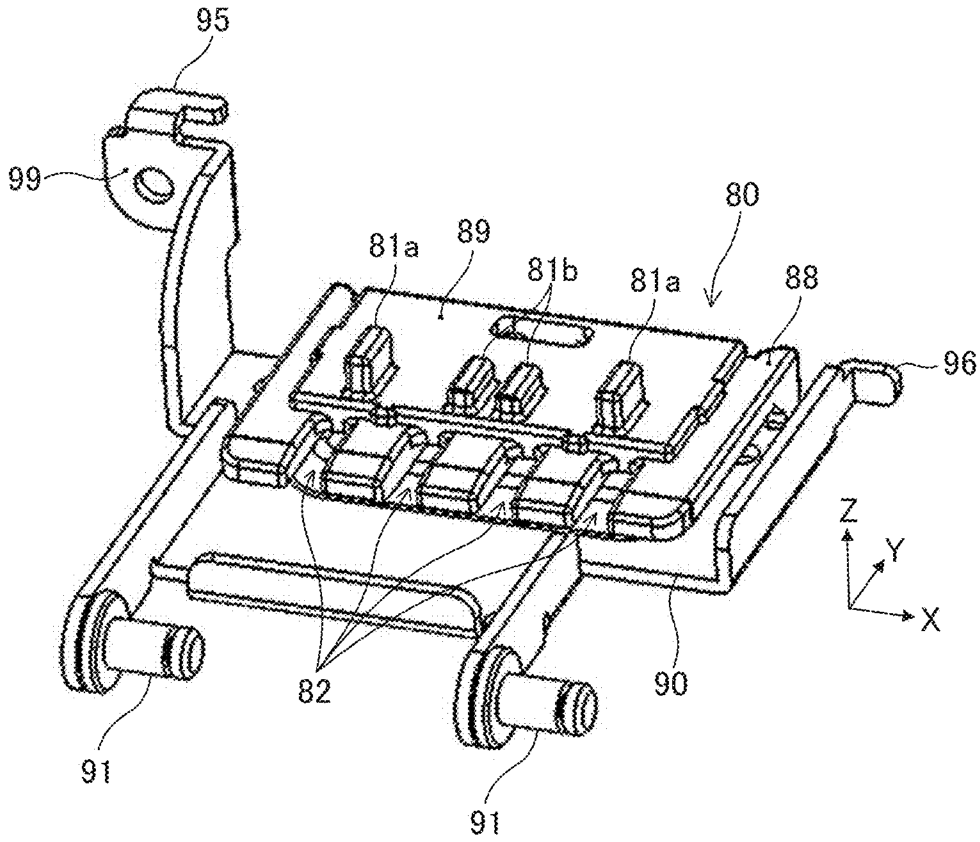
FIG. 10 is a perspective view of a key and the metal plate component.
Figure 11:
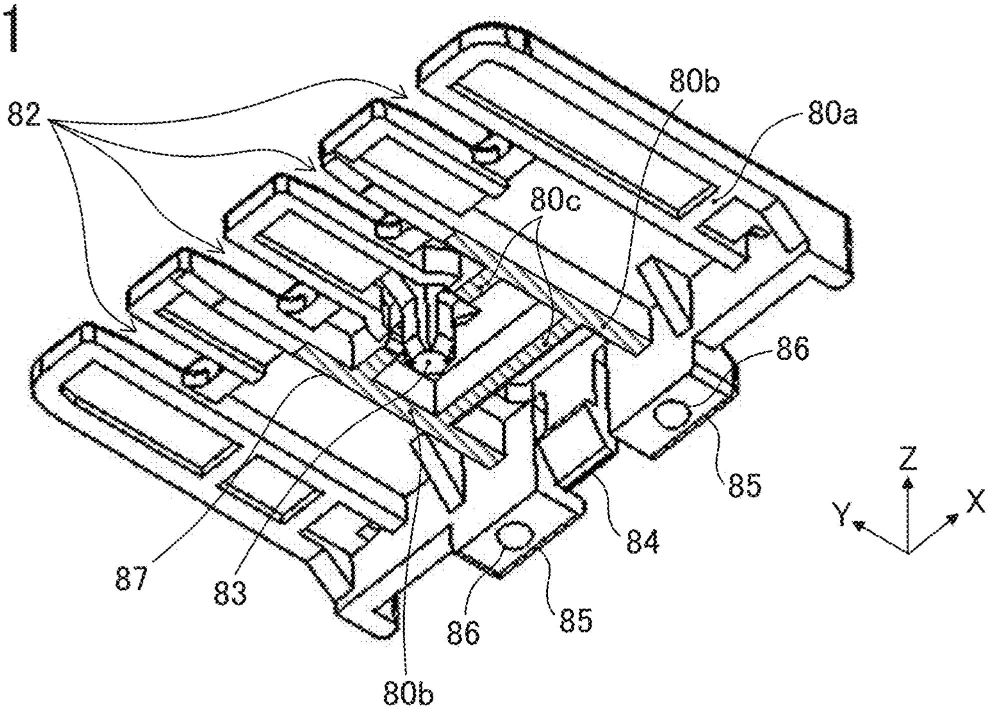
FIG. 11 is a perspective view of the key including a bottom side of the key.
Figure 12:
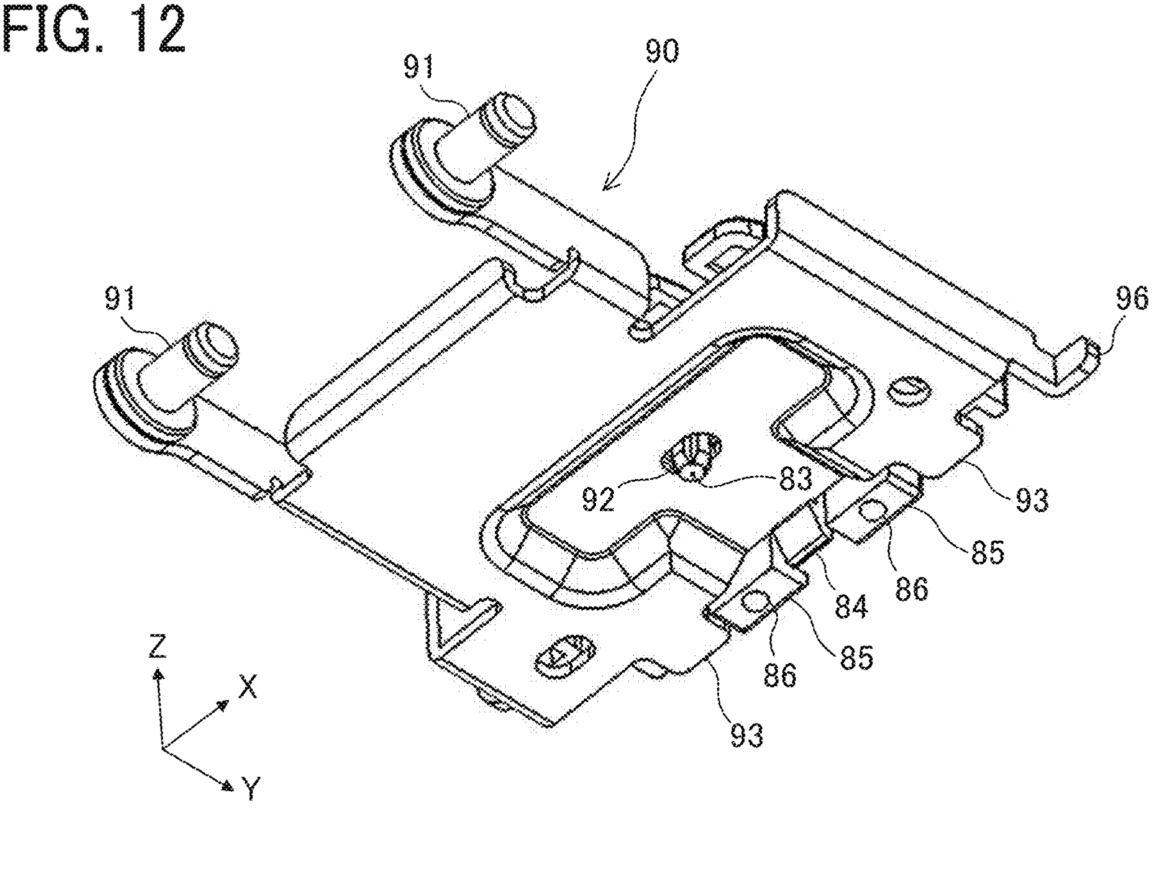
FIG. 12 is a perspective view of the metal plate component to which the key is attached, including a bottom side of the metal plate component.
Figure 13:
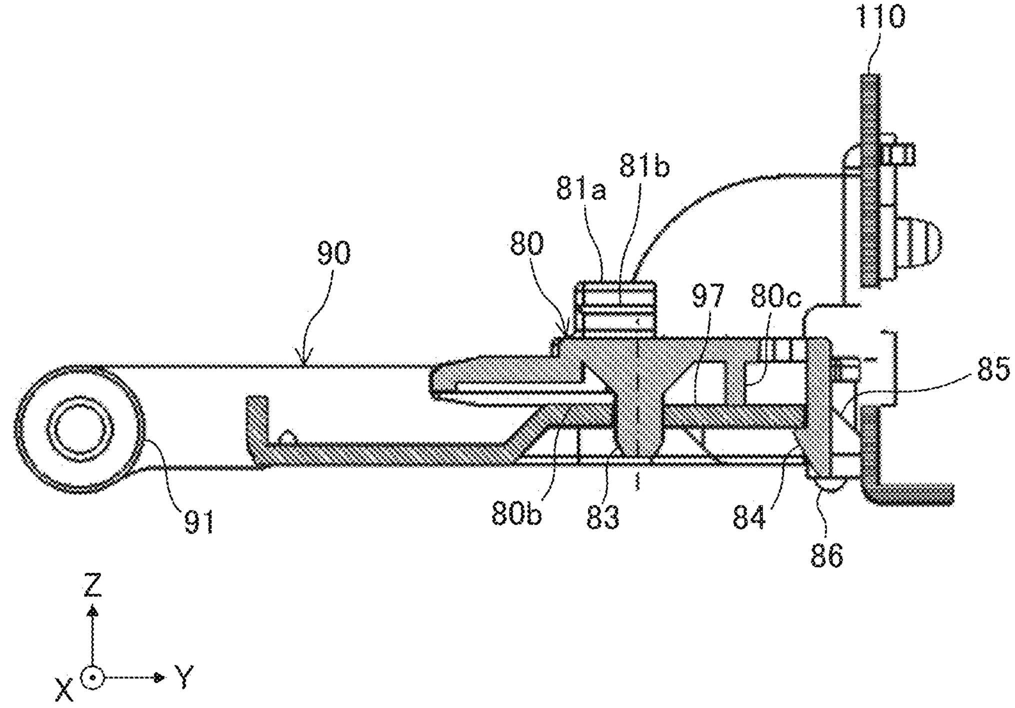
FIG. 13 is a cross-sectional view of the metal plate component to which the key is attached.

FIG. 10 is a perspective view of the key 80 and the metal plate component 90. FIG. 11 is a perspective view of the key 80 including a bottom side of the key 80. FIG. 12 is a perspective view of the metal plate component 90 to which the key 80 is attached, including a bottom side of the metal plate component 90. FIG. 13 is a cross-sectional view of the metal plate component 90 to which the key 80 is attached.

As illustrated in FIG. 10, the key 80 has an exposed face 89. The blocking projections 81*a* and 81*b* are on the exposed face 89 and form a part of the bottom face portion 71*a* in the recessed portion forming a part of the bottle insertion opening 71. In addition, the key 80 includes a storage portion 88 around the exposed face 89. The storage portion 88 is one step lower than the exposed face 89 and stored in the bottle insertion cover 70. The key 80 has four fitting grooves 82 in front of the storage portion 88. The bottle insertion cover 70 includes four fitting projections 76 (see FIG. 14) that enter the four fitting grooves 82, respectively.

As illustrated in FIG. 11, the key 80 includes a positioning boss 83 substantially at the center of the bottom side of the key 80 to position the key 80 with respect to the metal plate component 90. In addition, the key 80 includes a fitting claw 84 at the center of the back side of the key 80 in the X direction (that is the left-right direction of the image forming apparatus). The fitting claw 84 is snapped into the metal plate component 90 and fixed on the metal plate component 90. The key 80 includes a pair of abutting portions 85 adjacent to both sides of the fitting claw 84. The pair of the abutting portions 85 abut against the front side plate 110 of the image forming apparatus (see FIG. 13). Each of the pair of abutting portions 85 includes a hemispherical projection 86 on the bottom face of the abutting portion 85. The hemispherical projection 86 is fitted into a hole 77 (see FIG. 15) of the bottle insertion cover 70.

The key 80 includes reinforcing ribs 80*a*, 80*b*, and 80*c* on the bottom side of the key 80. The reinforcing ribs 80*b* and 80*c* face the contact pedestal 97 of the metal plate component 90 and are higher than the other reinforcing ribs 80*a*. The hatched portion 87 illustrated in FIG. 11 and formed by the reinforcing ribs 80*b* and 80*c* facing the contact pedestal 97 of the metal plate component 90 comes into contact with the contact pedestal 97, and the key 80 is supported by the metal plate component 90 (see also FIG. 13).

As illustrated in FIGS. 12 and 13, inserting the positioning boss 83 into the positioning hole 92 of the metal plate component 90 positions the key 80 on the metal plate component 90. Hooking the fitting claw 84 on the back side of the contact pedestal 97 of the metal plate component 90 assembles the key 80 to the metal plate component 90.

As illustrated in FIG. 13, assembling the key 80 to the metal plate component 90 causes the reinforcing ribs 80*b* and 80*c* to come into contact with the contact pedestal 97 of the metal plate component 90, and the key 80 is supported by the metal plate component 90. As illustrated in FIG. 13, the pair of abutting portions 85 of the key 80 also abuts against the front side of the front side plate 110 of the image forming apparatus.

Figure 14:
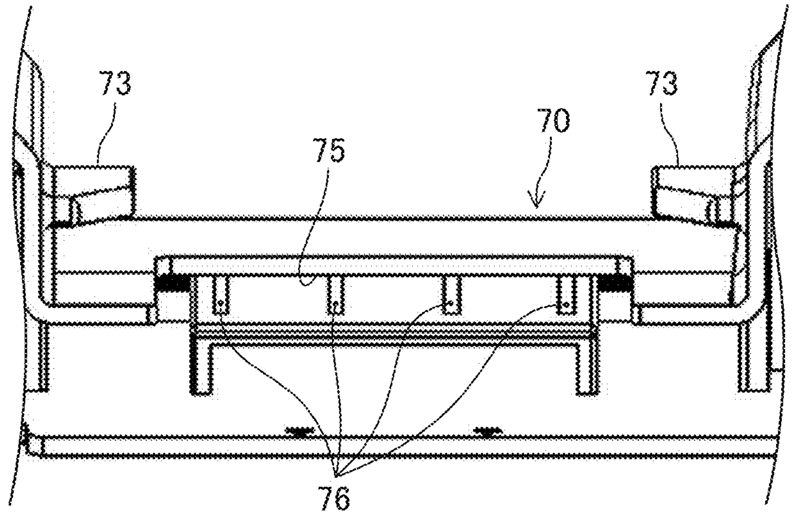
FIG. 14 is a view of a lower portion of a bottle insertion opening of a bottle insertion cover.
Figure 15:
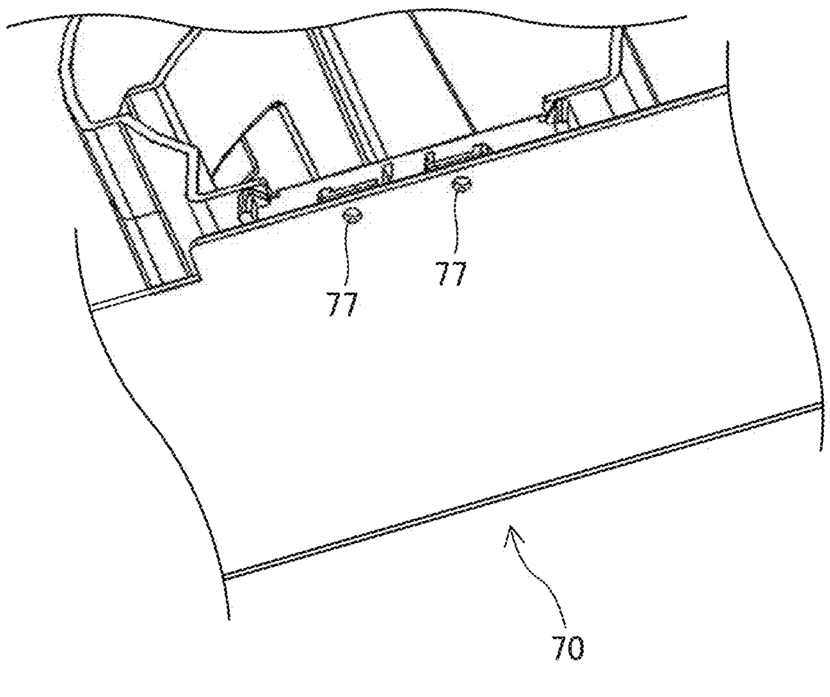
FIG. 15 is a perspective view of the bottle insertion cover viewed from below.

FIG. 14 is a view of a lower portion of the bottle insertion opening 71 of the bottle insertion cover 70. FIG. 15 is a perspective view of the bottle insertion cover 70 viewed from below.

As illustrated in FIG. 14, the bottle insertion cover 70 has a key insertion opening 75. The front side of the storage portion 88 (see FIG. 10) of the key 80 is inserted into the key insertion opening 75. The bottle insertion cover 70 includes four fitting projections 76 disposed in the key insertion opening 75. As illustrated in FIG. 15, the bottle insertion cover 70 has a pair of holes 77 in the bottom of the bottle insertion cover 70. The pair of projections 86 of the key 80 are fitted into the pair of holes 77.

Inserting the front side of the storage portion 88 of the key 80 into the key insertion opening 75 causes the four fitting projections 76 to enter and fit into the corresponding fitting grooves 82 of the key 80. When the fitting projection 76 is fitted into the fitting groove 82, the pair of projections 86 of the key 80 is fitted into the pair of holes 77 of the bottle insertion cover 70. As a result, the key 80 is assembled to the bottle insertion cover 70.

Figure 16:
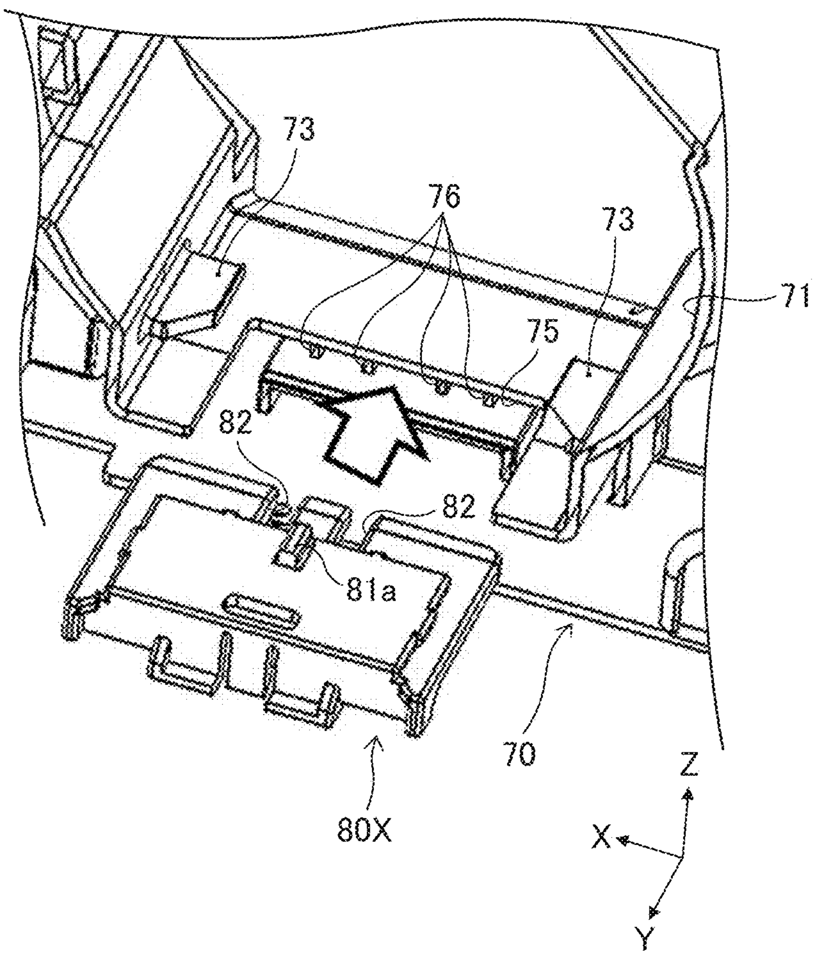
FIG. 16 is a perspective view of a key that is incompatible with the image forming apparatus of FIG. 1 and moved toward the bottle insertion cover.

FIG. 16 is a perspective view of a key 80X that is incompatible with the image forming apparatus 100 and moved toward the bottle insertion cover 70.

Figure 17:
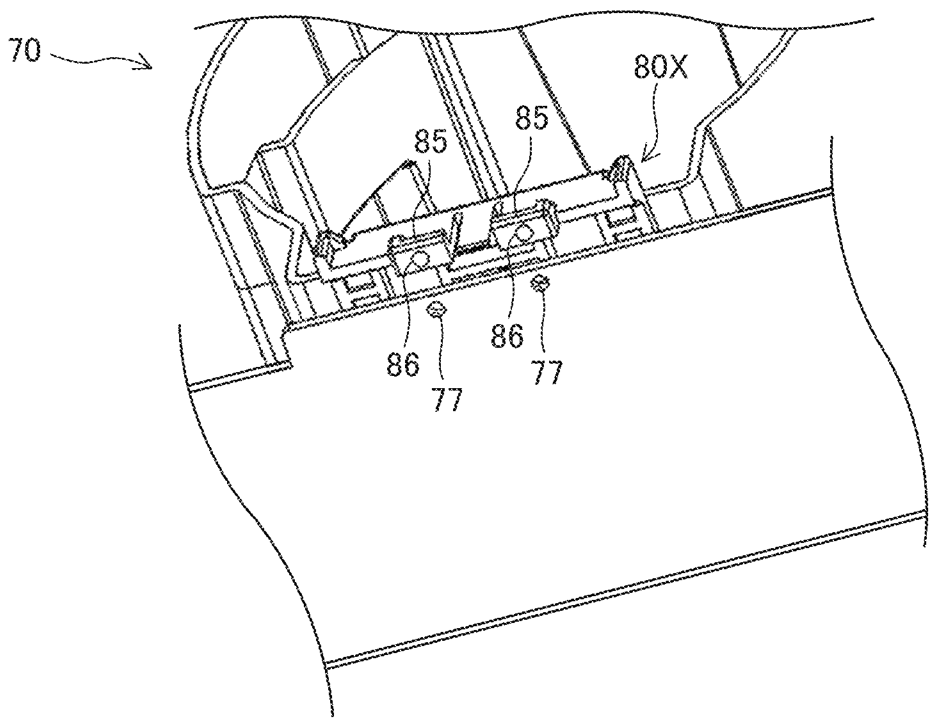
FIG. 17 is a perspective view of the key incompatible with the image forming apparatus of FIG. 1, illustrating the key not to be assembled to the bottle insertion cover.

The key 80X is assembled to another image forming apparatus and incompatible with the image forming apparatus 100. The key 80X includes one blocking projection 81*a* at the center of the key 80X and has two fitting grooves 82. Even if the key 80X incompatible with the image forming apparatus 100 is tried to be assembled to the bottle insertion cover 70 of the image forming apparatus 100, the fitting projection 76 is not fitted into the fitting groove 82 because the fitting groove 82 and the fitting projection 76 are not matched with each other. The front side of the storage portion 88 of the key 80X cannot be inserted into the key insertion opening 75. As a result, as illustrated in FIG. 17, the pair of projections 86 of the key 80X is not fitted into the pair of holes 77 of the bottle insertion cover 70, and the key 80X incompatible with the image forming apparatus 100 is not erroneously assembled to the bottle insertion cover 70.

Figure 18:
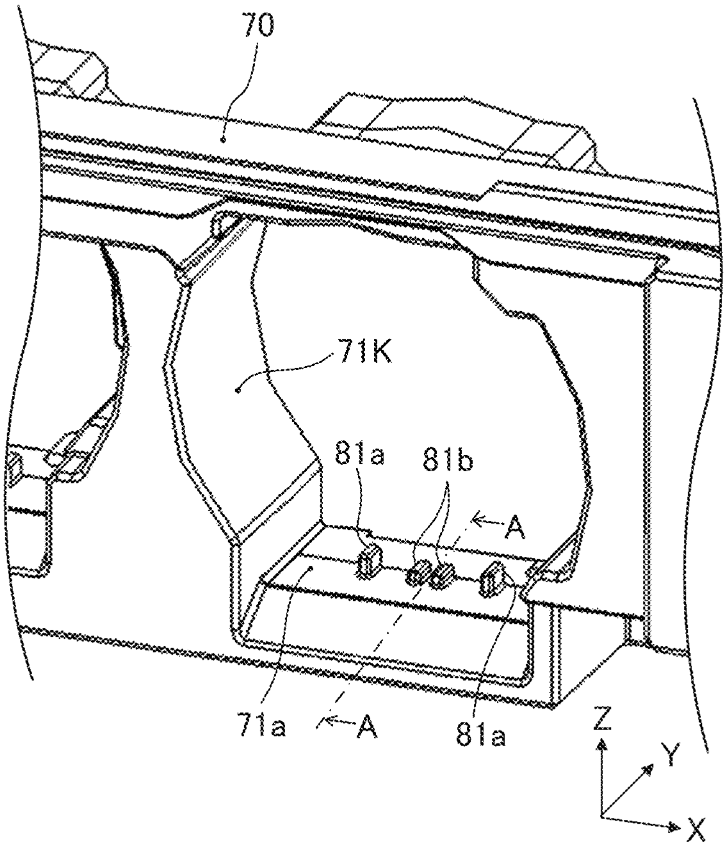
FIG. 18 is a perspective view of a bottle insertion cover according to a comparative example.
Figure 19A:
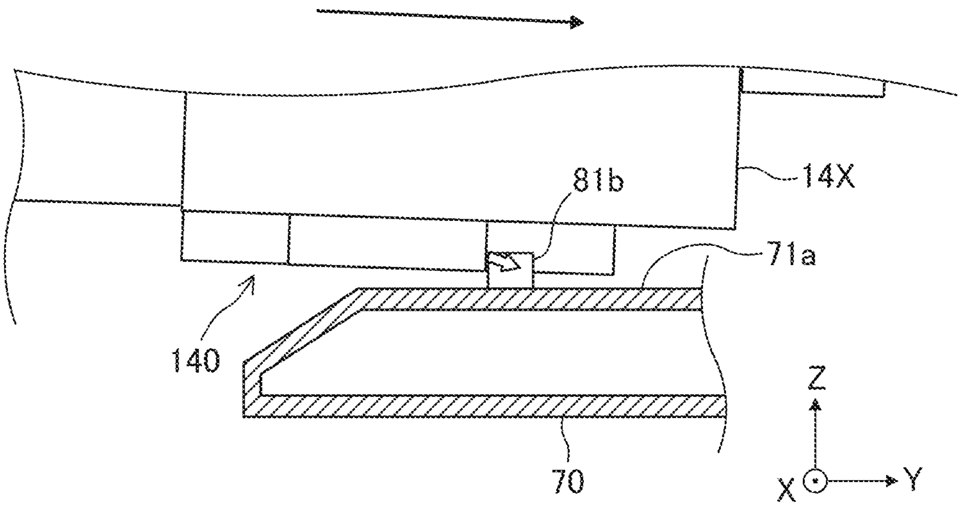
FIGS. 19A and 19B are schematic diagrams illustrating an incompatible toner bottle erroneously inserted into the bottle insertion cover according to the comparative example.
Figure 19B:
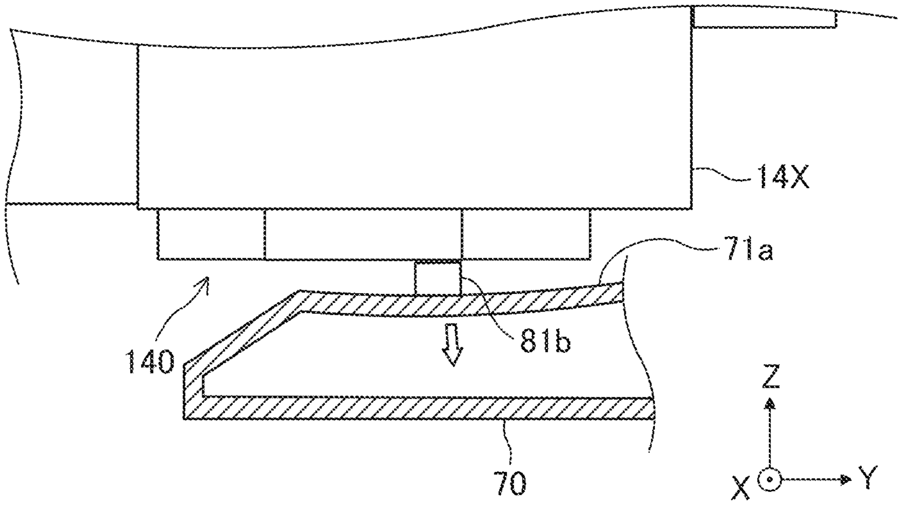

FIG. 18 is a perspective view of a bottle insertion cover 70 according to a comparative example, and FIGS. 19A and 19B are schematic diagrams illustrating the incompatible toner bottle 14X erroneously inserted into the bottle insertion cover 70 according to the comparative example.

As illustrated in FIG. 18, the bottle insertion cover 70 according to the comparative example is made of resin and molded together with the blocking projections 81*a* and 81*b*. As illustrated in FIGS. 19A and 19B, the inside of the bottom face structure including the bottom face portion 71*a* in the recessed portion of the bottle insertion cover 70 is hollow in order to remove the molded bottle insertion cover 70 from a mold of the bottle insertion cover 70.

FIG. 19A illustrates the blocking projections 81*b* in the comparative example butted by the fitting portion 140 of the incompatible toner bottle 14X illustrated in FIG. 5. The incompatible toner bottle 14X is tried to be inserted into the bottle insertion opening 71.

Inserting the incompatible toner bottle 14X into the bottle insertion opening 71 from obliquely above applies a downward force to the blocking projection 81. The downward force may deform the bottom face portion 71*a*, and the bottom face portion 71*a* may be bent downward and form a concave shape as illustrated in FIG. 19B. On the bottom face portion, the blocking projection 81*b* of the bottle insertion cover 70 is formed. As a result, the blocking projection 81*b* may be displaced downward. Displacing the blocking projection 81*b* downward as described above may cause the fitting portion 140 to ride over the blocking projection 81*b*. As a result, the incompatible toner bottle 14X may be inserted into the image forming apparatus 100.

To prevent the above-described disadvantage, disposing a reinforcing rib on the bottom face portion 71*a* on which the blocking projection 81*b* is formed to increase the rigidity of the bottom face portion 71*a* may be considered. However, the reinforcing rib has to extend in the front-back direction (that is the Y direction) in order to allow the mold for molding the bottle insertion cover 70 to be removed after molding the bottle insertion cover 70. Such a reinforcing rib cannot reinforce the bottom face portion 71*a*. The reinforcing rib extending in the X direction can be provided on the upper face of the bottom face portion 71*a* (the face on which the blocking projection 81*b* is provided), but the appearance is deteriorated. Increasing the thickness of the bottom face portion 71*a* to increase the rigidity of the bottom face portion 71*a* causes sink marks, which deteriorates dimensional accuracy.

Figure 20:
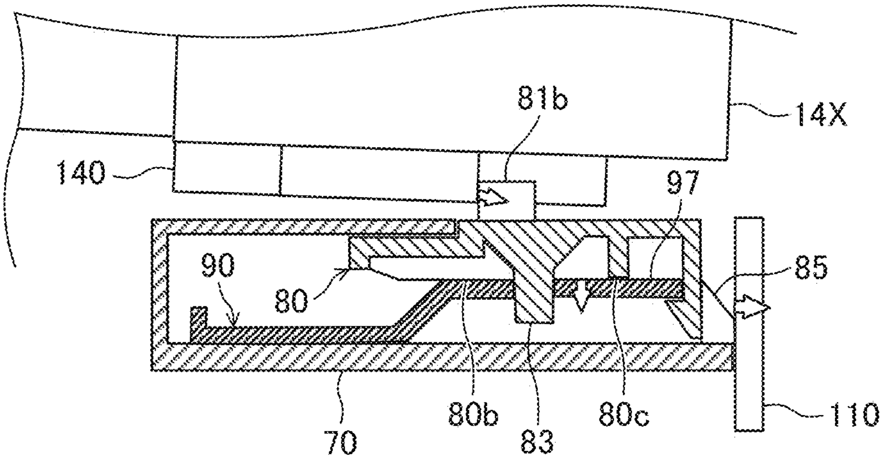
FIG. 20 is a schematic diagram illustrating a fitting portion of the incompatible toner bottle butting on a blocking projection in the image forming apparatus of FIG. 1.

FIG. 20 is a schematic diagram illustrating the fitting portion 140 of the incompatible toner bottle 14X butting on the blocking projection 81*a* in the image forming apparatus 100 according to the present embodiment.

In the image forming apparatus 100, the metal plate component 90 supports the key 80 including the blocking projections 81*b*. The metal plate component 90 can receive the downward force applied to the blocking projections 81*b* by inserting the incompatible toner bottle 14X into the bottle insertion opening 71 from obliquely above. The metal plate component 90 has a higher rigidity than a component made of resin. Therefore, the bending deformation due to the above-described force in the present embodiment is smaller than that in the component made of resin in the comparative example. Accordingly, the downward displacement of the blocking projection 81*b* is reduced.

Further, the pair of abutting portions 85 of the key 80 and the pair of abutting portions 93 (see FIG. 7) of the metal plate component 90 abut against the front side plate 110 of the image forming apparatus. The metal plate component 90 is fastened to the front side plate 110 of the image forming apparatus. The downward force applied to the blocking projection 81 presses the front end of the metal plate component 90 downward, but the above-described structure prevents the metal plate component 90 from tilting together with the key 80. As a result, the downward displacement of the blocking projection 81*b* is further reduced.

In the present embodiment, the front side plate 110 made by a sheet metal having higher rigidity than the component made of resin receives the force that tries to incline the metal plate component 90 together with the key 80 from the abutting portions 85 and 93 and the fastened portion 99. A deformation amount when the front side plate 110 receives the force that tries to incline the metal plate component 90 together with the key 80 from the abutting portions 85 and 93 is smaller than a deformation amount when the component made of resin receives the force from the abutting portions 85 and 93. The downward force applied to the blocking projection 81 presses the front end of the metal plate component 90 downward, but the above-described structure further prevents the metal plate component 90 from tilting together with the key 80.

The above-described structure in the present embodiment can favorably prevent the blocking projection 81*b* from being displaced downward when the fitting portion 140 of the incompatible toner bottle 14X collides with the blocking projection 81*b*. As a result, the described structure can favorably prevent the fitting portion 140 from getting over the blocking projection 81*b* and the incompatible toner bottle 14X from being inserted.

In the present embodiment, the blocking projection 81*b* is disposed on a separate member from the bottle insertion cover 70, which enables forming a member in which the blocking projection 81*b* is disposed (that is the key 80) to be a plate shape. Forming the member to be the plate shape enables molding the member to have the reinforcing rib 80*b* extending in the Y direction (that is the front-back direction of the image forming apparatus) and the reinforcing rib 80*c* extending in the X direction (that is the left-right direction of the image forming apparatus) that are on the back face of the member opposite to the face on which the blocking projections 81*a* and 81*b* are disposed (that is the exposed face 89) without any difficulty. The above-described structure can increase the rigidity of the key 80. As a result, the above-described structure can prevent the key from deforming when the downward force is applied to the blocking projection 81*b* and further prevent the blocking projection 81*b* from moving downward.

In addition, a face of the metal plate component 90 orthogonal to the vertical direction other than the contact pedestal 97 raised upward is in contact with the bottle insertion cover 70. The above-described structure enables the bottle insertion cover 70 to receive the downward force applied to the blocking projections 81*a* and 81*b*. The above-described double structure including the metal plate component 90 and the bottle insertion cover 70 and receiving the downward force applied to the blocking projections 81*a* and 81*b* can further reduce the downward displacement of the blocking projections 81*a* and 81*b*.

In the present embodiment, the guide projections 73 are disposed on the recessed portion forming the bottle insertion opening 71 as illustrated in FIG. 4. When the toner bottle 14 is inserted, the guide projection 73 enters the guide groove 14*a* illustrated in FIG. 5, and the toner bottle 14 is inserted into the bottle insertion opening 71 while being guided by the guide projections 73. The guide projections 73 regulate the posture of the toner bottle 14 to some extent when the toner bottle 14 is inserted into the bottle insertion opening 71. The above-described structure can prevent the toner bottle 14 from being inserted in a posture in which the downstream side of the toner bottle 14 in an insertion direction in which the toner bottle is inserted is inclined downward. As a result, the above-described structure can reduce the downward force applied to the blocking projection 81*b* when the fitting portion 140 butts against the blocking projection 81*b*. Accordingly, the above-described structure can further reduce the downward displacement of the blocking projection 81*b* and favorably prevent the incompatible toner bottle from riding over the blocking projection 81*b* and being inserted into the image forming apparatus.

In the present embodiment, the left portion of the key 80 in FIG. 20 is inserted into the bottle insertion cover 70 so that the left portion of the key 80 faces the lower face of the bottle insertion cover 70.

Hitting the fitting portion 140 of the toner bottle 14 against the blocking projection 81*b* applies a force in the insertion direction to the blocking projection 81*b* so as to rotate the key 80 clockwise in FIG. 20. However, the key 80 does not rotate clockwise in FIG. 20 because the left portion of the key 80 abuts the bottle insertion cover 70. The above-described structure can prevent the positioning boss 83 of the key 80 from coming off from the positioning hole of the metal plate component 90 and the key 80 from coming off from the metal plate component 90.

Figure 21:
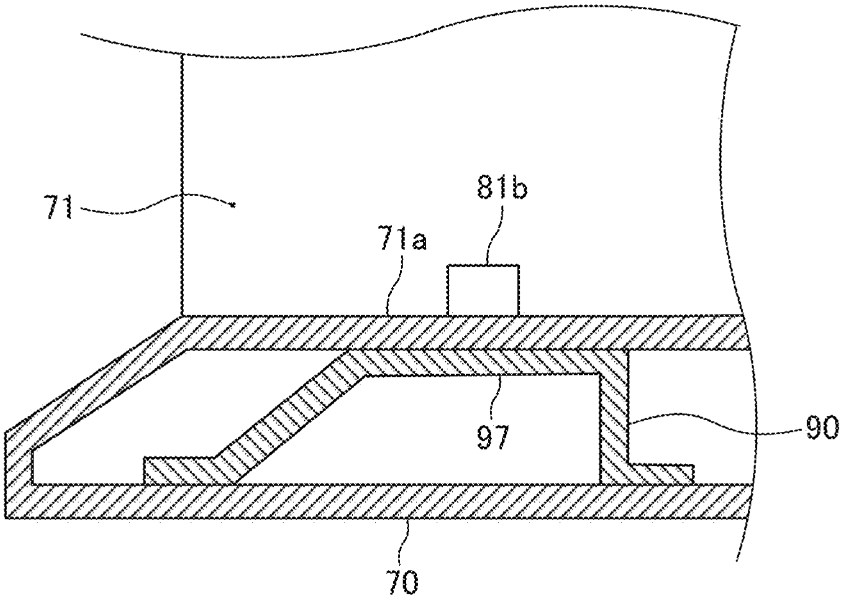
FIG. 21 is a schematic diagram illustrating a configuration of a modification of the embodiment.

FIG. 21 is a schematic diagram illustrating a configuration of a modification of the present embodiment.

In this modification, the blocking projection 81*b* is molded integrally with the bottle insertion cover 70 made of resin, and the metal plate component 90 is inside the hollow of the bottle insertion cover 70. The contact pedestal 97 of the metal plate component 90 contacts the bottom face portion 71*a* of the bottle insertion cover 70 on which the blocking projections 81*b* is formed in the bottle insertion opening 71. Even in such a configuration, the metal plate component 90 can receive the downward force applied to the blocking projection 81 when the fitting portion 140 of the incompatible toner bottle 14X collides with the blocking projection 81*b*. The above-described structure can reduce the downward displacement of the blocking projection 81*b* and prevent the incompatible toner bottle 14X from being inserted into the bottle insertion opening 71. In FIG. 21, the bottle insertion cover 70 serves as the stopper.

The following describes the lock device 40 to lock the bottle cover 20 at the closed position.

Figure 22:
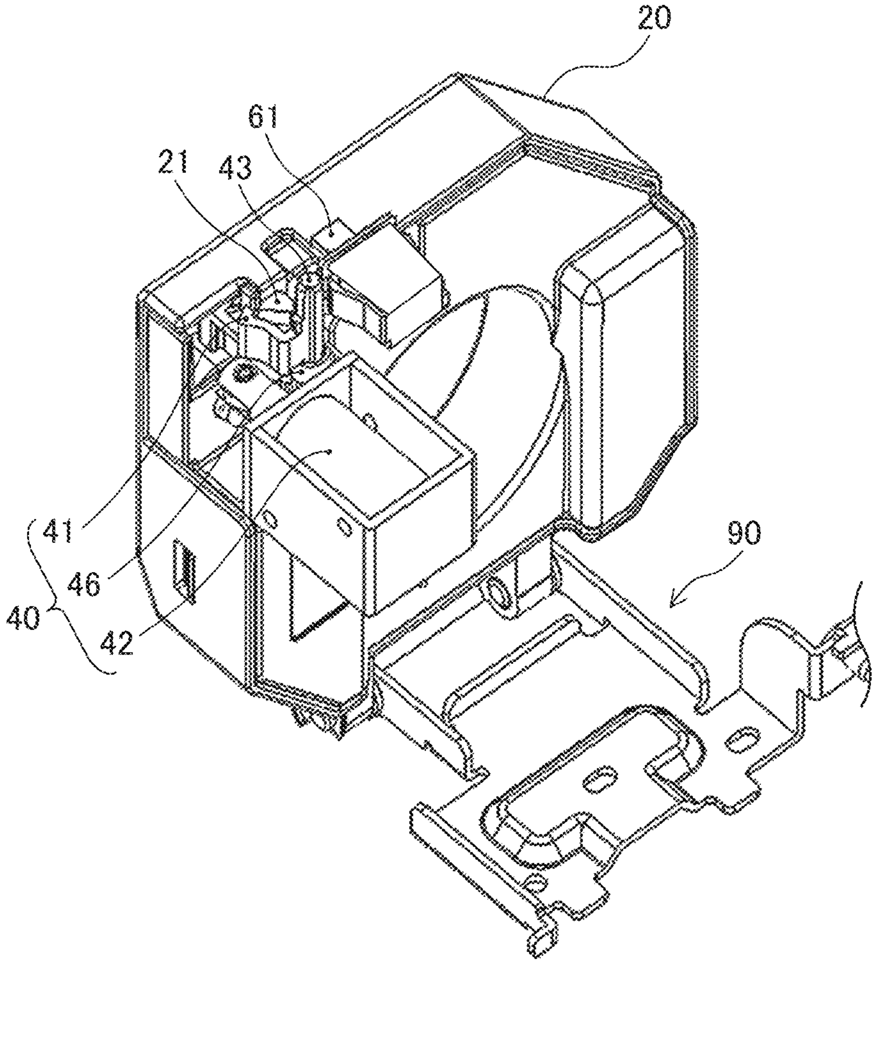
FIG. 22 is a perspective view of a bottle cover, a lock device, a switch, and the metal plate component.
Figure 23A:
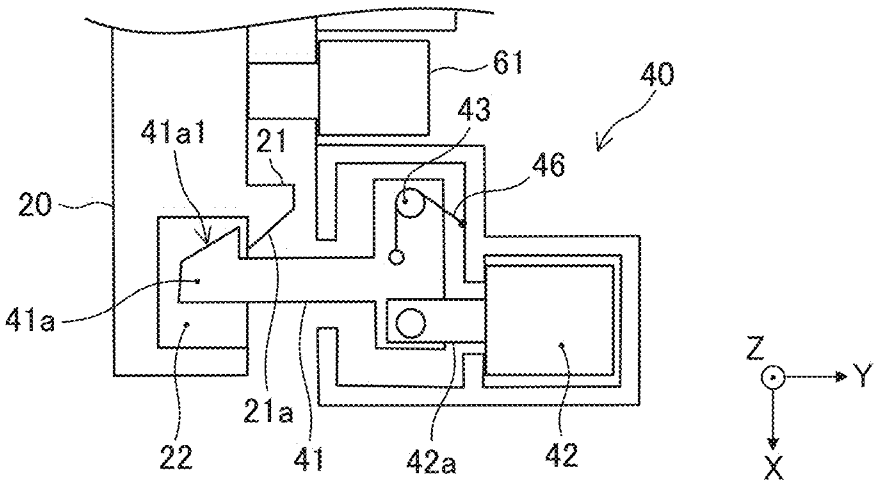
FIGS. 23A and 23B are schematic diagrams each illustrating a configuration of the lock device viewed from above.
Figure 23B:
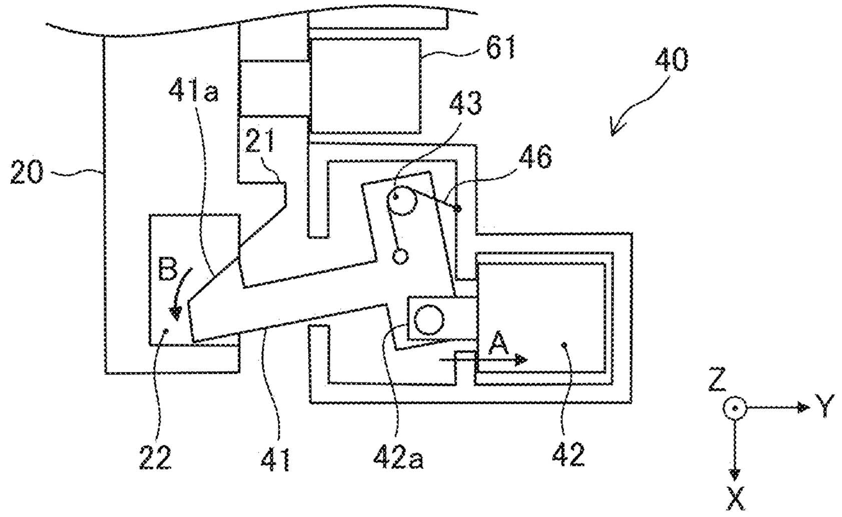

FIG. 22 is a perspective view of the bottle cover 20, the lock device 40, an opening and closing switch 61, and the metal plate component 90. FIGS. 23A and 23B are schematic diagrams each illustrating a configuration of the lock device 40 viewed from above. In FIG. 23A, the lock device 40 locks the bottle cover 20. In FIG. 23B, the lock device 40 unlocks the bottle cover 20.

Above the bottle insertion opening 71, the lock device 40 and the opening and closing switch 61 are disposed. The lock device 40 locks the bottle cover 20Y at the closed position. The opening and closing switch 61 detects whether the bottle cover 20 is closed or opened.

The lock device 40 includes a solenoid 42 and the lock lever 41 including the lock claw 41*a* at a tip of the lock lever 41. The lock device 40 includes a support shaft 43 rotatably supporting the lock lever 41. The lock device 40 includes a torsion spring 46 serving as a biasing member attached to the support shaft 43. The torsion spring 46 applies a force to the lock lever 41 to be positioned at a lock position illustrated in FIG. 23A. The lock lever 41 is rotatably attached to a plunger 42*a* (a movable metallic core) of the solenoid 42.

As illustrated in FIG. 23A, the bottle cover 20 has the locked portion 21 and the lock claw housing 22 into which the lock claw 41*a* of the lock lever 41 enters.

When the bottle cover 20 is locked at a closed position, the lock claw 41*a* of the lock lever 41 enters the lock claw housing 22 and faces the locked portion 21. The lock claw 41*a* is in front of the locked portion 21 in the bottle cover 20. In the above-described structure, opening the bottle cover 20 causes the locked portion 21 to butt the lock claw 41*a*. As a result, the bottle cover 20 is locked at the closed position.

As illustrated in FIG. 23B, energizing the solenoid 42 generates an electromagnetic force pulling the plunger 42*a* in a direction indicated by an arrow A illustrated in FIG. 23B. The plunger 42*a* rotates the lock lever 41 in a direction indicated by an arrow B in FIG. 23B against the force applied by the torsion spring 46. As a result, the lock claw 41*a* of the lock lever 41 does not face the locked portion 21, and the lock is released. Thus, the bottle cover 20 can be opened. A biasing member applies force to the bottle cover 20 such that the bottle cover 20 is automatically rotated to an open position. However, the biasing member is unnecessary if the bottle cover 20 can be moved to the open position by its own weight.

Cutting off the energization of the solenoid 42 loses the electromagnetic force pulling the plungers 42*a*, and the force applied by the torsion spring 46 rotates the lock lever 41 clockwise in FIG. 23B to position the lock lever 41 at the lock position. Subsequently, closing the bottle cover 20 causes the projection 21*a* of the locked portion 21 to butt against an inclined portion 41*al* of the lock claw 41*a*. Further closing the bottle cover 20 causes the lock lever 41 to rotate counterclockwise in FIGS. 23A and 23B and causes the lock claw 41*a* to climb over the locked portion 21 into the lock claw housing 22. After the lock claw 41*a* enters the lock claw housing 22, the force applied by the torsion spring 46 rotates the lock lever 41 clockwise in FIG. 23A. As a result, the lock claw 41*a* faces the locked portion 21, and the bottle cover 20 is locked.

In addition, an upper portion of the bottle cover 20 at the closed position pushes the opening and closing switch 61 to turn on the opening and closing switch 61. On the other hand, opening the bottle cover 20 turns off the opening and closing switch 61. As a result, the opening and closing switch 61 can detect opening and closing of the bottle cover 20.

Figure 24:
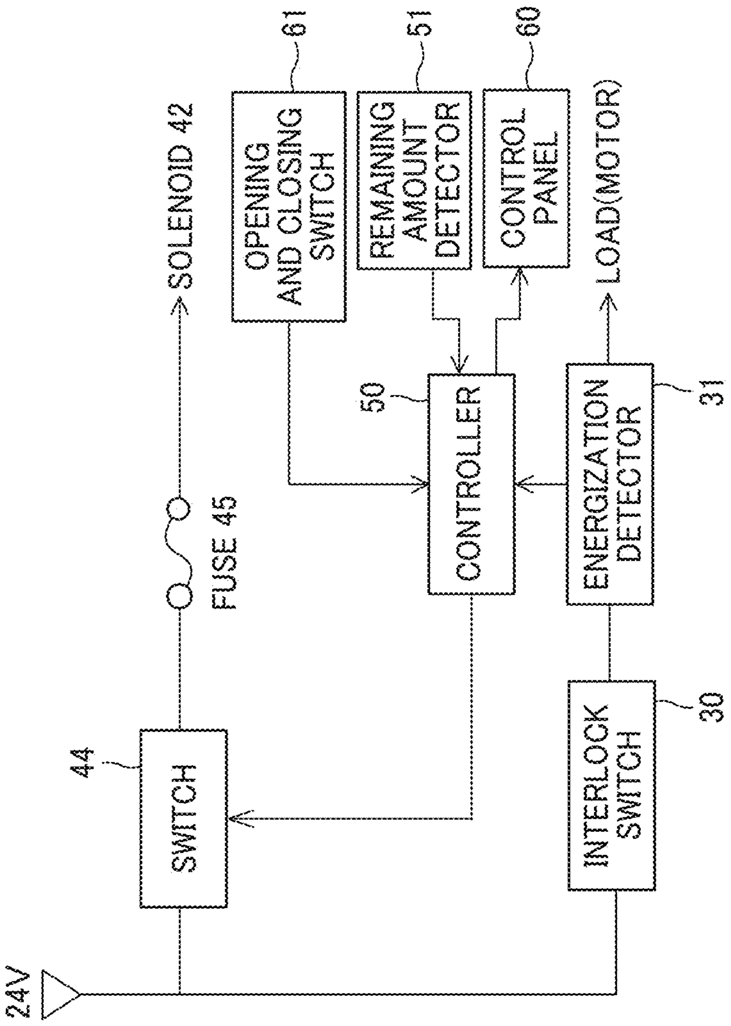
FIG. 24 is a block diagram of a circuit to drive a solenoid.

FIG. 24 is a block diagram of a circuit to drive the solenoid 42.

As illustrated in FIG. 24, the solenoid 42 is coupled to a 24V power supply via a switch 44 and a fuse 45. Opening the front cover 3*a* turns off the interlock switch 30 to cut off an electrical connection between the 24V power supply and a load (i.e., an electric component) such as a motor for the image forming section 3. Between the interlock switch 30 and the load, an energization detector 31 is disposed to detect whether a voltage is applied from the 24V power supply to the load. When opening the front cover 3*a* turns off the interlock switch 30, the energization detector 31 detects that no voltage is applied to the load (0V). As a result, the controller 50 can detect that the front cover 3*a* is opened. On the other hand, when closing the front cover 3*a* turns on the interlock switch 30, the energization detector 31 detects that the voltage is applied to the load. As a result, the controller 50 can detect that the front cover 3*a* is closed. As described above, the opening-and-closing detector in the present embodiment to detect whether the front cover 3*a* is opened or closed includes the interlock switch 30 and the energization detector 31.

Alternatively, the opening-and-closing detector to detect whether the front cover 3*a* is opened or closed may include, for example, a filler disposed on the front cover 3*a* and an optical sensor to detect the filler. Based on an output voltage from the optical sensor, the controller 50 may determine whether the front cover 3*a* is opened or closed. The opening-and-closing detector may include a magnet disposed on the front cover 3*a* and a magnetic sensor to detect a magnetic force of the magnet. Based on an output voltage from the magnetic sensor, the controller 50 may determine whether the front cover 3*a* is opened or closed. However, the interlock switch 30 to detect whether the front cover 3*a* is opened or closed has the following advantage. The opening-and-closing detector including the interlock switch 30 can reduce the number of components to be smaller than other opening-and-closing detectors including additional components to detect whether the front cover 3*a* is opened or closed. As a result, the cost of the image forming apparatus can be reduced.

The controller 50 is coupled to the energization detector 31, a remaining amount detector 51 that detects the amount of toner remaining in each of the toner bottles 14Y, 14M, 14C, and 14K, a control panel 60, the switch 44 that turns on or off the energization of the solenoid 42, and the opening and closing switch 61 that detects the opening and closing the bottle cover 20.

The remaining amount detector 51 may use any one of various detection methods. For example, the remaining amount detector 51 may determine the amount of toner remaining in each of the toner bottles based on a calculation result of a toner consumption amount in each color image that can be calculated from a number of sheets printed and other factors. Alternatively, the remaining amount detector 51 may determine the amount of toner remaining in each of the toner bottles based on an electrostatic capacity in each of the toner bottles 14 or an electrostatic capacity in a toner conveyance path to convey each toner from the toner bottle 14 to the corresponding developing device.

The remaining amount detector 51 may use a toner supply system that supplies the toner to the developing device. For example, the toner supply system includes a toner concentration sensor detecting a toner concentration in developer in the developing device, and the controller controls a toner supply system to supply the toner to the developing device so that the toner concentration detected by the toner concentration sensor is in a target toner concentration range. Alternatively, the toner supply system may include an optical sensor detecting the image density of an image pattern formed on the photoconductor or the intermediate transfer belt, and the controller controls the toner supply system to supply the toner to the developing device so that the image density detected by the optical sensor is in a target image density range. When the toner density or the image density does not reach the target value although the toner is supplied by the above-described toner supply system, the controller can determine that the toner depletion occurs in the toner bottle. As described above, the remaining amount detector 51 may be formed.

The remaining amount detector 51 may use a toner remaining amount sensor assembled to a sub-hopper on the toner conveyance path between the toner bottle 14 and the corresponding developing device. The toner depletion in the toner bottle causes a decrease in an amount of toner in the sub-hopper. When the toner remaining amount sensor detects amounts of toner that each are equal to or smaller than an experimentally determined amount of toner for an experimentally determined time, the controller can determine that the toner depletion occurs in the toner bottle.

When the remaining amount detector 51 detects the toner depletion of any one of the yellow, magenta, cyan, and black toners in the toner bottles 14, the controller 50 controls the control panel 60 to display a notification indicating the toner bottle in which the toner depletion is detected and an instruction to replace the toner bottle with a new toner bottle 14. In addition, the controller 50 determines whether the front cover 3*a* is opened based on detection results of the energization detector 31 that detects whether the interlock switch 30 is turned on or off when the remaining amount detector 51 detects the toner depletion. In response to determination that the front cover 3*a* is opened, the controller 50 turns on the switch 44.

As a result, the 24V power supply supplies electric power to the solenoid 42 to open the lock of the bottle cover 20 corresponding to the toner bottle in which the toner depletion is detected.

Subsequently, the controller 50 determines whether the opening and closing switch 61 is turned off after the predetermined time has passed since the 24V power supply supplies the electric power to the solenoid 42. If the opening and closing switch 61 is not turned off and cannot detect the opening of the bottle cover 20, the controller 50 controls the control panel 60 to display an error message.

In the present embodiment, opening the front cover 3*a* turns off the interlock switch 30 but does not turn off the switch 44 to supply power to the solenoid 42. If the solenoid 42 causes a short circuit, an excessive current flows to the solenoid 42. The fuse 45 shuts off the excessive current to protect circuits in the apparatus main body.

Figure 25:
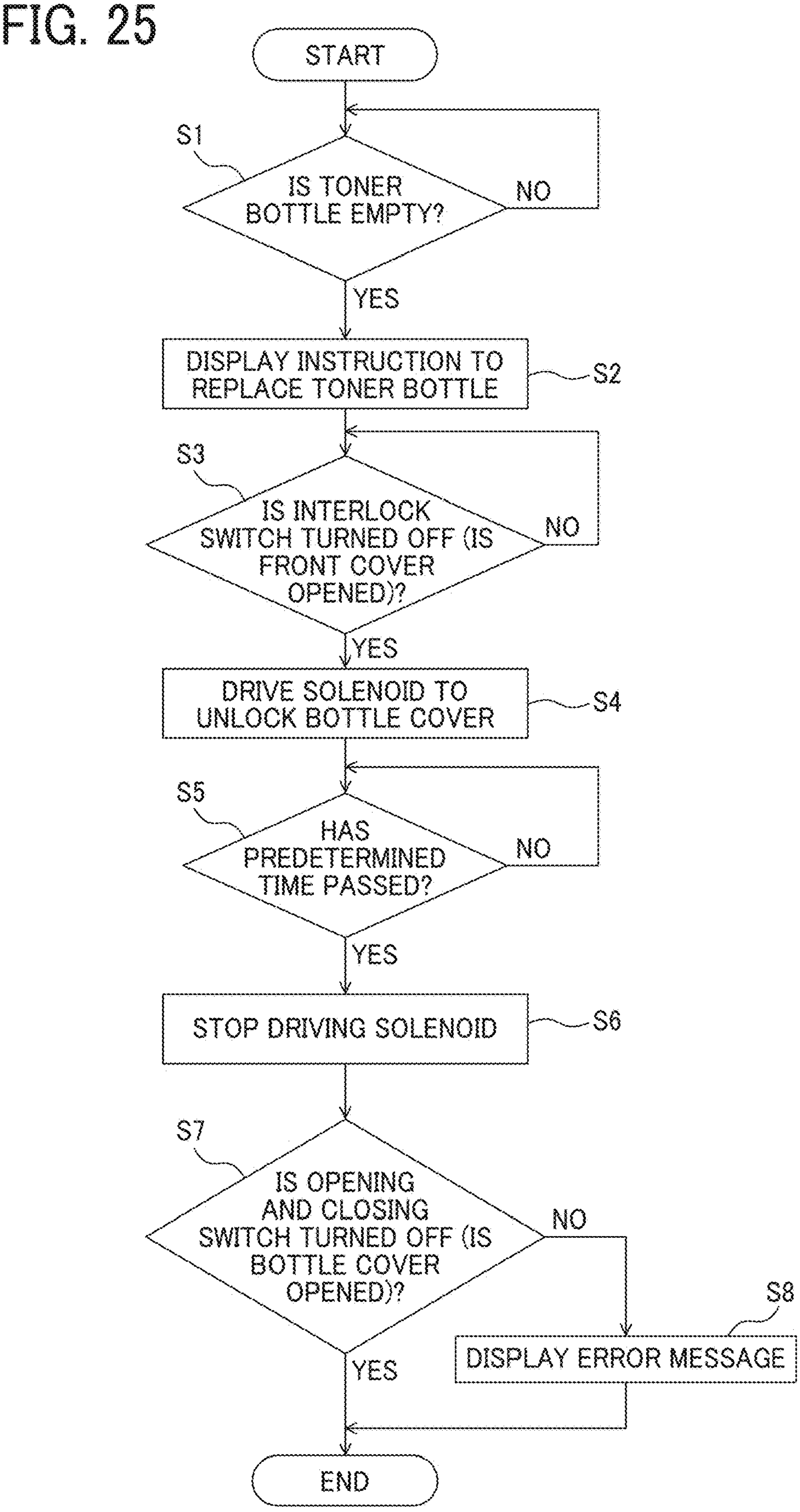
FIG. 25 is a flowchart of control to unlock the bottle cover.

FIG. 25 is a flowchart of control to unlock the bottle cover 20.

When the remaining amount detector 51 detects the toner depletion of any one of the yellow, magenta, cyan, and black toners in the toner bottles 14 (Yes in step S1), the controller 50 controls the control panel 60 to display the instruction to replace the toner bottle in which the toner depletion is detected with a new toner bottle 14 in step S2.

The user opens the front cover 3*a* to replace the toner bottle 14 with a new one. Opening the front cover 3*a* turns off the interlock switch 30, and the controller 50 detects that the front cover 3*a* has been opened (Yes in S3).

After the controller 50 detects that the front cover 3*a* is opened, the controller 50 turns on the switch 44 to energize the solenoid 42 and drives the solenoid 42 in step S4. The driven solenoid 42 rotates the lock lever 41 to unlock the bottle cover 20 as described above. As a result, the above-described control opens the bottle cover 20 corresponding to the toner bottle 14 in which the toner depletion is detected together with the front cover 3*a* and exposes the toner bottle 14 in which the toner depletion is detected. Opening the bottle cover 20 corresponding to the toner bottle 14 in which the toner depletion is detected as described above enables the user to easily specify the toner bottle 14 to be replaced, and the replacement workability of the toner bottle 14 can be enhanced.

After the controller 50 turns on the switch 44 to start energization of the solenoid 42, the controller 50 starts measuring time. In response to the elapse of a predetermined amount of time (Yes in step S5), the controller 50 turns off the switch 44 to cut off the energization to the solenoid 42 and stop the driving of the solenoid 42 in step S6.

Subsequently, the controller 50 determines whether the opening and closing switch 61 is turned off in step S7. If the opening and closing switch 61 is turned on (No in step S7), the bottle cover 20 is not physically opened and some abnormality may occur. Accordingly, the controller 50 controls the control panel 60 to display the error message together with a notification that the bottle cover 20 corresponding to the toner bottle 14 in which the toner depletion is detected is not opened in step S8.

In the present embodiment, the controller 50 detects that the front cover 3*a* is opened in response to turning off the interlock switch 30 and unlocks the bottle cover corresponding to the toner bottle in which the toner depletion is detected. Unlocking the bottle cover causes opening the bottle cover 20 together with the front cover 3*a*. Since the bottle cover is opened, the controller 50 may stop driving the solenoid 42 and return the lock lever 41 to the lock position to lock the bottle cover in response to the elapse of the predetermined amount of time after the start of driving of the solenoid 42. The above-described structure and control can reduce the energization time to the solenoid 42. For example, the controller 50 may energize the solenoid 42 to unlock the bottle cover 20 after the remaining amount detector 51 detects the toner depletion and cut off the energization to the solenoid 42 after the controller 50 detects that the bottle cover 20 is opened. However, the energization time to the solenoid 42 in such a structure and control is longer than the energization time to the solenoid 42 in the present embodiment.

In the present embodiment, the controller 50 unlocks the bottle cover corresponding to the toner bottle in which the toner depletion is detected, and the bottle cover corresponding to the toner bottle in which the toner depletion is detected automatically opens. The above-described structure and control can enhance the replacement workability of the toner bottle 14 to be better than an image forming apparatus in which the user operates the control panel 60 to unlock the bottle cover corresponding to the toner bottle in which the toner depletion is detected.

In the present embodiment, the solenoid 42 rotates the lock lever 41, but the present disclosure is not limited to this. For example, a gear mechanism may rotate the lock lever 41.

In the present embodiment, the blocking projection of the key 80 is used to block inserting the toner bottle incompatible with the image forming apparatus 100 into the bottle insertion opening, but the present disclosure is not limited to this. For example, the blocking projection may be used to block inserting a toner bottle containing toner with a color different from a corresponding color into the bottle insertion opening. In this case, the number, shapes, and positions in the X direction of the blocking projections provided on the key 80 are made different among yellow, magenta, cyan and black. The above-described structure can prevent, for example, the toner bottle filled with yellow toner from being erroneously inserted into the bottle housing for the toner bottle filled with black toner.

In addition, the keys for yellow, magenta, cyan, and black are designed to have a different number of the fitting grooves 82 differently positioned in the X direction. As a result, the key incompatible with the color cannot be entered into the key insertion opening 75, thereby preventing erroneous assembly of the key.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure. For example, the present disclosure may be used to prevent a detachable unit detachably attached to the apparatus body such as the image forming unit from erroneously being attached to the apparatus body in addition to the toner bottle.

The configurations according to the above-descried embodiments are examples, and embodiments of the present disclosure are not limited to the above. For example, the following aspects can achieve effects described below.

First Aspect

In a first aspect, an image forming apparatus such as the image forming apparatus 100 includes an apparatus body, a detachable unit such as the toner bottle 14, a metal plate component such as the metal plate component 90, an insertion cover such as the bottle insertion cover 70, and a stopper such as the key 80. The detachable unit is detachably attached to the apparatus body. The insertion cover has an insertion opening such as the bottle insertion opening 71 into which the detachable unit is insertable in an insertion direction. The stopper includes a blocking projection such as the blocking projection 81*b* and a contact such as the reinforcing ribs 80*b* and 80*c*. The blocking projection is inside the insertion opening of the insertion cover. The blocking projection has a shape that matches with a groove of the detachable unit compatible with the apparatus body, such as each of the toner bottles 14Y, 14M, 14C, and 14K, and does not match with a groove of the detachable unit incompatible with the apparatus body, such as the toner bottle 14X. The contact contacts the metal plate component in a direction orthogonal to the insertion direction. The direction orthogonal to the insertion direction is the vertical direction in the above embodiments.

According to the first aspect, as described in the embodiments, the rigidity of the metal plate component can prevent the breakage contacting the metal plate component in the direction orthogonal to the insertion direction from being bent in the direction orthogonal to the insertion direction by the force in the direction orthogonal to the insertion direction that is applied to the blocking projection when the unit incompatible with the apparatus body butts on the block projection. The above-described structure can prevent the incompatible unit from getting over the blocking projection and being attached to the apparatus body.

Second Aspect

In a second aspect, the apparatus body in the image forming apparatus according to the first aspect includes a side plate such as the front side plate 110, and the metal plate component such as the metal plate component 90 is fastened to the side plate.

According to the second aspect, as described in the embodiments, the side plate such as the front side plate 110 can prevent the metal plate component such as the metal plate component 90 from being inclined together with the stopper such as the key 80 when the unit incompatible with the apparatus body such as the incompatible toner bottle butts on the blocking projection such as the blocking projection 81*b* and applies the force to the blocking projection in the direction orthogonal to the insertion direction. The above-described structure can reduce the downward displacement of the blocking projection and favorably prevent the incompatible unit from being mounted over the blocking projection 81*b*.

Third Aspect

In a third aspect, the apparatus body in the image forming apparatus according to the first aspect or the second aspect includes a side plate such as the front side plate 110, and the metal plate component such as the metal plate component 90 includes a contact portion such as the abutting portion 93 contacting the side plate in the insertion direction.

According to the second aspect, as described in the embodiments, the side plate such as the front side plate 110 can prevent the metal plate component such as the metal plate component 90 from being inclined together with the stopper such as the key 80 when the unit incompatible with the apparatus body such as the incompatible toner bottle butts on the blocking projection such as the blocking projection 81*b* and applies the force to the blocking projection in the direction orthogonal to the insertion direction. The above-described structure can reduce the downward displacement of the blocking projection and favorably prevent the incompatible unit from being mounted over the blocking projection 81*b*.

Fourth Aspect

In a fourth aspect, an upstream end of the stopper such as the key 80 in the insertion direction is inside the insertion cover such as the bottle insertion cover 70.

According to the fourth aspect, as described in the embodiments, the insertion cover such as the bottle insertion cover 70 can prevent the upstream end of the stopper in the insertion direction from being pushed up by the force in the insertion direction when the incompatible unit such as the incompatible toner bottle butts against the blocking projection 81*b*. The above-described structure can prevent the stopper from being detached from the metal plate component 90.

Fifth Aspect

In a fifth aspect, the apparatus body in the image forming apparatus according to any one of the first to fourth aspects includes a side plate such as the front side plate 110, and the stopper such as the key 80 includes a contact portion such as the abutting portion 85 contacting the side plate in the insertion direction.

According to the second aspect, as described in the embodiments, the side plate such as the front side plate 110 can prevent the metal plate component such as the metal plate component 90 from being inclined together with the stopper such as the key 80 when the unit incompatible with the apparatus body such as the incompatible toner bottle butts on the blocking projection such as the blocking projection 81*b* and applies the force to the blocking projection in the direction orthogonal to the insertion direction.

Sixth Aspect

In a sixth aspect, the metal plate component such as the metal plate component 90 in the image forming apparatus according to any one of the first to fifth aspects contacts the insertion cover such as the bottle insertion cover 70 in the direction orthogonal to the insertion direction.

According to the sixth aspect, as described in the embodiments, the double structure including the metal plate component and the insertion cover such as the bottle insertion cover 70 and receiving the downward force applied to the blocking projection 81*b* can further reduce the downward displacement of the blocking projection 81*b*.

Seventh Aspect

In a seventh aspect, the image forming apparatus according to any one of the first to sixth aspects further includes a rotator such as the bottle cover 20, and the metal plate component such as the metal plate component 90 includes a support shaft such as the support shaft 91 rotatably supporting the rotator.

According to the seventh aspect, as described in the embodiments, the metal plate component can prevent the support shaft such as the support shaft 91 from being deformed and inclined by an impact applied to the rotator such as the bottle cover 20.

Eighth Aspect

In an eighth aspect, the insertion cover such as the bottle cover 20 in the image forming apparatus according to the seventh aspect includes the rotator to openably close the insertion opening such as the bottle insertion opening.

The structure according to the eighth aspect can prevent the occurrence of the disadvantage that the cover such as the bottle cover cannot be closed.

Ninth Aspect

In a ninth aspect, the detachable unit in the image forming apparatus according to any one of the first to eighth aspects includes a toner bottle.

The structure according to the ninth aspect can prevent the incompatible toner bottle from being attached to the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an apparatus body;

a detachable unit detachably attached to the apparatus body, the detachable unit including a groove;

a metal plate component;

an insertion cover having an insertion opening into which the detachable unit is insertable in an insertion direction; and a stopper including:

a projection inside the insertion opening of the insertion cover, the projection being within the groove when the detachable unit is fully attached to the apparatus body where the detachable unit dispenses a substance to the apparatus body; and a protrusion contacting the metal plate component in a projection direction of the projection, wherein the metal plate component contacts the insertion cover in a direction orthogonal to the insertion direction.

2. The image forming apparatus according to claim 1, wherein:

the apparatus body includes a side plate, and the metal plate component is fastened to the side plate.

3. The image forming apparatus according to claim 1, wherein:

the apparatus body includes a side plate, and the metal plate component includes a contact portion contacting the side plate in the insertion direction.

4. The image forming apparatus according to claim 1, wherein:

an upstream end of the stopper in the insertion direction is inside the insertion cover.

5. The image forming apparatus according to claim 1, wherein:

the apparatus body includes a side plate, and the stopper includes a contact portion contacting the side plate in the insertion direction.

6. The image forming apparatus according to claim 1, wherein:

the detachable unit includes a toner bottle, and the substance includes toner.

7. The image forming apparatus according to claim 1, wherein:

the groove is on an underside of the detachable unit, and the detachable unit includes a toner container.

8. The image forming apparatus according to claim 1, wherein:

the projection prevents an incompatible detachable unit from being mounted in the image forming apparatus.

9. The image forming apparatus according to claim 1, further comprising:

a closing cover, wherein the metal plate component includes a support shaft rotatably supporting the closing cover.

10. The image forming apparatus according to claim 9, wherein:

the insertion cover includes the closing cover to openably close the insertion opening.

11. The image forming apparatus according to claim 9, wherein:

the support shaft supporting the closing cover is oriented in a horizontal direction, relative to an orientation of the image forming apparatus.

* * * * *